(12) United States Patent
Smith

(10) Patent No.: US 11,760,148 B2
(45) Date of Patent: Sep. 19, 2023

(54) DETERMINING VEHICLE POSE USING RIDE HEIGHT SENSORS

(71) Applicant: Nuro, Inc., Mountain View, CA (US)

(72) Inventor: Russell Smith, Los Altos, CA (US)

(73) Assignee: Nuro, Inc., Mountain View, CA (US)

( * ) Notice: Subject to any disclaimer, the term of this patent is extended or adjusted under 35 U.S.C. 154(b) by 430 days.

(21) Appl. No.: 16/585,179

(22) Filed: Sep. 27, 2019

(65) Prior Publication Data

US 2021/0094376 A1    Apr. 1, 2021

(51) Int. Cl.
*B60G 17/018* (2006.01)
*G05D 1/02* (2020.01)
*G05D 1/00* (2006.01)

(52) U.S. Cl.
CPC ......... *B60G 17/018* (2013.01); *G05D 1/0274* (2013.01); *B60G 2400/252* (2013.01); *B60G 2400/256* (2013.01); *B60G 2800/914* (2013.01); *G05D 1/0011* (2013.01)

(58) Field of Classification Search
None
See application file for complete search history.

(56) References Cited

U.S. PATENT DOCUMENTS

| | | | |
|---|---|---|---|
| 5,488,472 A | 1/1996 | January | |
| 7,840,352 B2 | 11/2010 | Strelow et al. | |
| 9,423,796 B2 | 8/2016 | Sullivan et al. | |
| 9,915,947 B1 * | 3/2018 | LaForge | G05D 1/0077 |
| 2003/0236603 A1 | 12/2003 | Lu | |
| 2013/0238198 A1 | 9/2013 | Prentice | |
| 2014/0136414 A1 | 5/2014 | Abhyanker | |
| 2017/0080770 A1 * | 3/2017 | Irwin | B62D 35/005 |
| 2017/0126810 A1 * | 5/2017 | Kentley | G06Q 50/30 |
| 2019/0160966 A1 * | 5/2019 | Jung | B60L 15/2072 |
| 2019/0283760 A1 * | 9/2019 | Jensen | B60W 40/10 |
| 2019/0369627 A1 * | 12/2019 | Green | B61L 3/006 |
| 2020/0094645 A1 * | 3/2020 | Edren | B60G 17/0165 |
| 2021/0011475 A1 * | 1/2021 | Haputhanthri | G05D 1/0291 |
| 2021/0354725 A1 * | 11/2021 | King | B60W 40/06 |

OTHER PUBLICATIONS

Harr, et al., "Fast and Robust Vehicle Pose Estimation by Optimizing Multiple Pose Graphs," 2018 21st International Conference on Information Fusion (FUSION), Jul. 2018, 8 pages.

(Continued)

*Primary Examiner* — Lail A Kleinman

(57) ABSTRACT

An autonomous robotic vehicle includes a chassis, wheels movably mounted to the chassis by a suspension system, and a vehicle pose system. The vehicle pose system includes a ride height sensor system, a processor, and memory. The sensor system is configured to measure wheel displacement of the wheels relative to the chassis. The sensor system includes ride height sensors that determine wheel positions of the wheels with respect to the chassis as the vehicle travels along a surface. The memory has instructions stored thereon which, when executed by the processor cause the vehicle pose system to determine a plane of the surface corresponding to the wheel positions so that the pose system can determine a pose of the vehicle based on an angle of the surface with respect to the vehicle.

20 Claims, 12 Drawing Sheets

(56) References Cited

OTHER PUBLICATIONS

Ma, et al., "Pose Estimation of Vehicles Over Uneven Terrain," ArXiv 2019, Mar. 7, 2019, 19 pages.
Ni, et al., "Pose Prediction of Autonomous Full Tracked Vehicle Based on 3D Sensor," Sensors (Basel), vol. 19(23), Dec. 2019, Published online Nov. 2019, 18 pages.
Prahara, et al., "Vehicle pose estimation for vehicle detection and tracking based on road direction," International Journal of Advances in Intelligent Informatics, vol. 3, No. 1, Mar. 2017, pp. 35-46.
International Search Report and Written Opinion in counterpart International Application No. PCT/US2020/044133, dated Nov. 19, 2020, 13 pages.

* cited by examiner

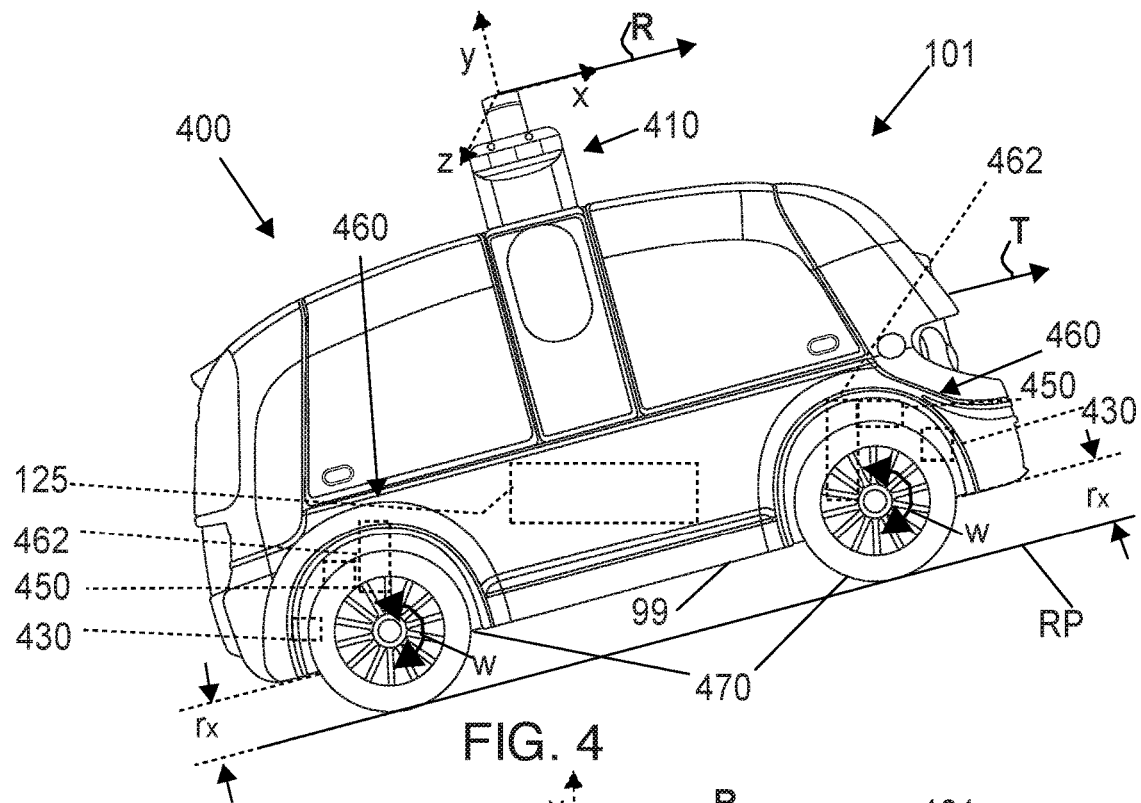
FIG. 4
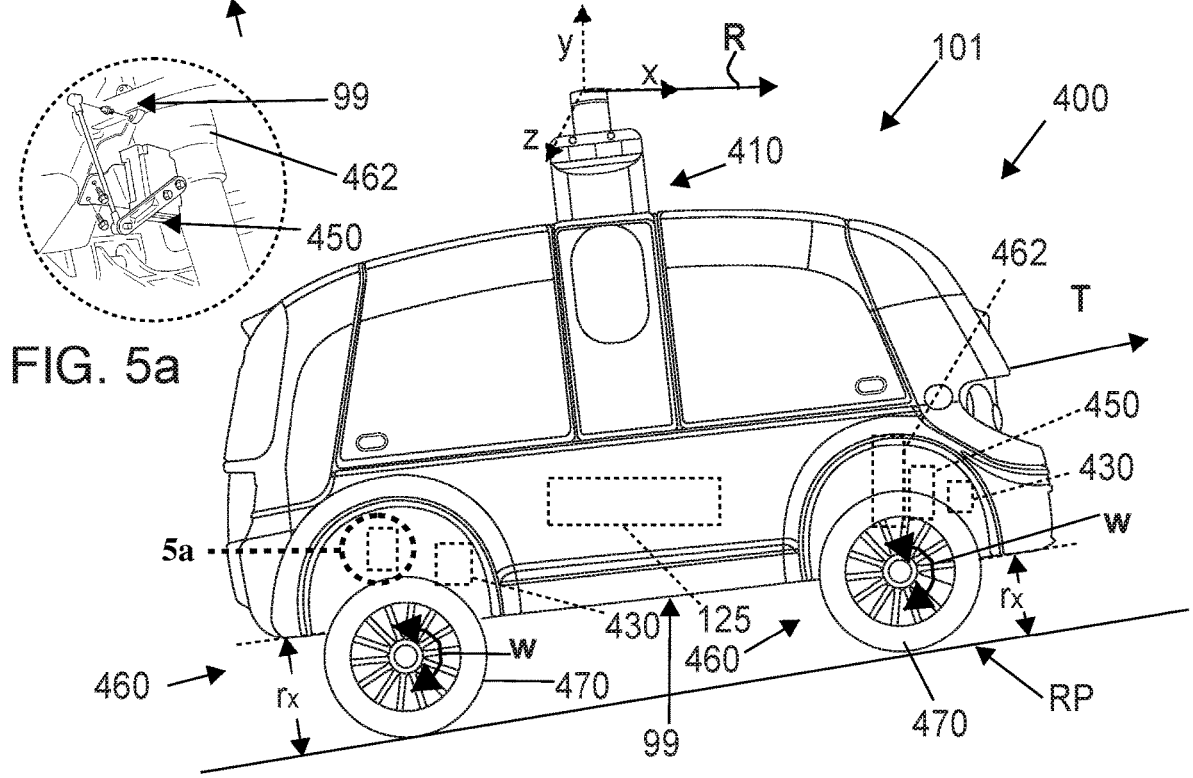
FIG. 5a
FIG. 5

DETERMINING VEHICLE POSE USING RIDE HEIGHT SENSORS

FIELD OF THE TECHNOLOGY

The present application relates to autonomous vehicles, and in particular, to systems and method for determining vehicle pose in autonomous or semi-autonomous robot vehicles.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

In the consumer space, handling and delivery of goods (e.g., property, merchandise, articles, groceries, packages, mail, equipment, prepared food, etc.) by autonomous vehicles could improve society in many ways. For example, rather than spending time driving to and/or from a store or office, or waiting on lines to procure or deliver such goods, customers can instead engage in productive work, entertainment, and/or rest while waiting for an autonomous vehicle to deliver such goods to or from these customers.

SUMMARY

This disclosure relates to a delivery system including a fleet of one or more fully-autonomous and/or semi-autonomous robot vehicles for transporting or retrieving deliveries in either an unstructured outdoor environment or a closed environment. To help carry out such autonomous deliveries, it is important to know precisely where such vehicles are, what such vehicles can handle, how they will get to where they are going, and when that will be. Being able to quickly and accurately determine pose of the autonomous vehicles can greatly improve the efficiencies and effectiveness of such deliveries as well as the performance of these vehicles.

In accordance with one aspect, the disclosure is directed to an autonomous robotic vehicle. The vehicle includes a chassis; a plurality of wheels movably mounted to the chassis by a suspension system, and a vehicle pose system. The vehicle pose system includes a ride height sensor system configured to measure wheel displacement of the plurality of wheels relative to the chassis as the plurality of wheels move relative to the chassis. The ride height sensor system includes ride height sensors configured to determine wheel positions of each of the plurality of wheels with respect to the chassis as the autonomous robotic vehicle travels along a surface. The ride height sensor system includes at least one processor and a memory having instructions stored thereon which, when executed by the at least one processor cause the vehicle pose system to determine a plane of the surface corresponding to the wheel positions so that the vehicle pose system can determine a pose of the autonomous robotic vehicle based on an angle of the surface with respect to the autonomous robotic vehicle.

In embodiments, the vehicle pose system may include an inertial measurement unit configured to collect orientation data of the autonomous vehicle, angular velocity data of the autonomous vehicle, gravitational direction data of the autonomous vehicle, or combinations thereof. The inertial measurement unit may include an accelerometer, a gyroscope, or combinations thereof.

In various embodiments, the vehicle pose system includes a global positioning system configured to collect global positioning data of the autonomous robotic vehicle.

In some embodiments, the vehicle pose system may include wheel speed sensors configured to collect wheel speed data of the plurality of wheels. The wheel speed sensors may be coupled to the plurality of wheels.

In certain embodiments, the vehicle pose system may be configured to associate global positioning data of the autonomous vehicle, wheel speed data of the autonomous vehicle, and ride height data of the autonomous vehicle to determine the pose of the autonomous vehicle based on 3D velocity and 3D position of the autonomous vehicle.

In embodiments, the ride height sensors may be coupled to the chassis, at least some of the plurality of wheels, the suspension system, or combinations thereof.

In various embodiments, when executed by the at least one processor, the instructions stored on the memory may cause the processor to map a position and orientation of the vehicle within a coordinate system based on the determined pose.

In some embodiments, the autonomous robotic vehicle may be a driverless vehicle.

According to one aspect, this disclosure is directed to a vehicle pose system for an autonomous robotic vehicle. The vehicle pose system includes a ride height sensor system, at least one processor, and a memory. The ride height sensor system is configured to measure wheel displacement of a plurality of wheels of the autonomous robotic vehicle relative to a chassis of the autonomous robotic vehicle as the plurality of wheels move relative to the chassis. The ride height sensor system includes ride height sensors configured to determine wheel positions of each of the plurality of wheels with respect to the chassis as the autonomous robotic vehicle travels along a surface. The memory has instructions stored thereon which, when executed by the at least one processor cause the vehicle pose system to determine a pose of the autonomous robotic vehicle based on an angle of the surface with respect to the autonomous robotic vehicle.

According to another aspect, this disclosure is directed to a method for determining vehicle pose of an autonomous robotic vehicle. The method includes determining vehicle pose of the autonomous robotic vehicle based on wheel displacement data generated by ride height sensors coupled to a wheel assembly of the autonomous robotic vehicle. The wheel displacement data includes wheel positions of wheels of the autonomous vehicle relative to a chassis of the autonomous vehicle.

The method may further include determining an angle of a road surface with respect to the autonomous robotic vehicle based on the wheel displacement data.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which:

FIGS. 4 and 5 are exemplary diagrams illustrating the robot vehicle of FIG. 1 disposed at selected positions relative to a road surface;

FIG. 5a is a diagram illustrating an exemplary ride height sensor connected to the robot vehicle of FIG. 5;

DETAILED DESCRIPTION

Figure 1:
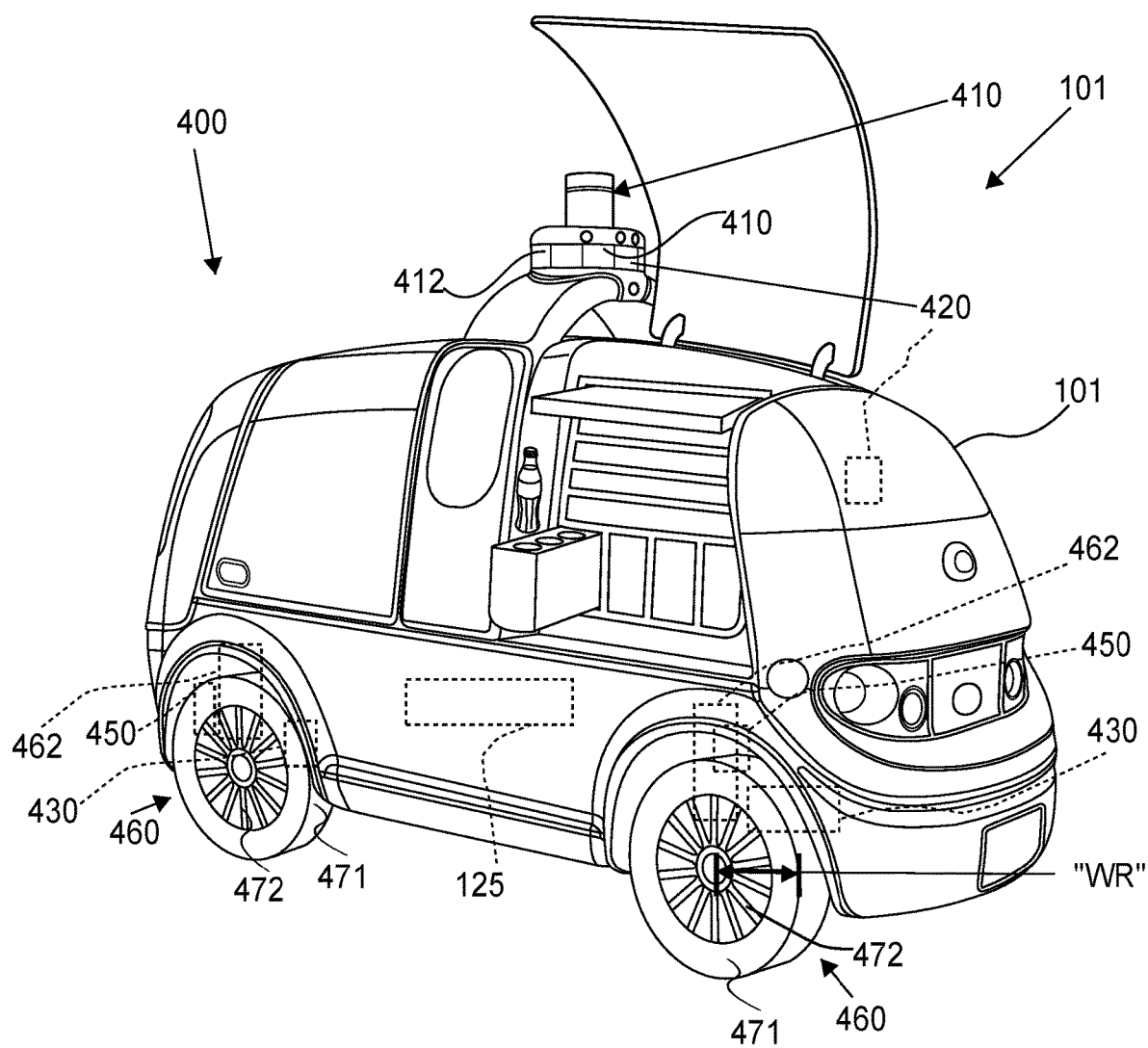
FIG. 1 is a perspective view of a robot vehicle in accordance with the principles of this disclosure.

This disclosure relates to a delivery system including a fully-autonomous and/or semi-autonomous robot fleet and, in particular, to one or more robot vehicles for transporting or retrieving deliveries in either open unstructured outdoor environments or closed environments. The disclosed systems include one or more autonomous vehicles for receiving orders for transporting goods/services to be delivered to delivery destinations (e.g., a customer home, office, warehouse, store, etc.). The one or more autonomous vehicles include securable storage compartments for supporting the goods/services while in transport between destinations.

The disclosed systems and methods provide the location and direction of one or more autonomous vehicles. More specifically, the one or more autonomous vehicles include a pose system for determining the precise positioning of one or more autonomous vehicles (AV) or robot vehicles in space. The pose system can generally include a ride height sensor to aid with collection and determination of data associated with the precise positioning of one or more components of the vehicle relative to the road or other components of the vehicle.

The pose system can receive, store, process, and/or transmit (1) data from an inertial measurement unit (IMU) (e.g., gyroscopes and/or accelerometers), (2) data from a global positioning system (GPS), and/or (3) data from sensors (e.g. ride height sensor, wheel speed sensor, or others), where such data or information may be in the form of input. As used herein, the term "IMU" includes electronic devices that measure and report specific force, angular rate, and/or magnetic field using a combination of accelerometers and/or gyroscopes. In some embodiments, magnetometers may additionally and/or alternatively be used. The output of the pose system may be a real-time estimate of the position and orientation (e.g., "pose") of the autonomous vehicle with respect to some coordinate system. Accurate determinations of pose are important to the performance of a robot vehicle since errors in pose determinations may result in incorrect assumptions related to environmental positioning of the vehicle, components thereof, or objects and/or goods stored by such vehicles, for example, and/or incorrect placement of sensor data on the robot's internal map.

In calculating pose, input sensors may be subject to measurement errors of various kinds that may further perpetuate error. However, even if there is zero measurement error, pose systems that utilize only IMU, GPS, and/or wheel speed input may overlook one important factor: angle of the road with respect to the chassis of the robot vehicle. This angle changes while driving as the robot vehicle bounces, pitches, and/or yaws by virtue of the vehicle's suspension and/or wheel assembly (and the condition, positioning, etc. thereof), for example. In pose calculations, this angle is often assumed to be zero for simplicity, but such assumption is equivalent to assuming a rigid suspension and a flat road; such circumstances are rarely accurate. The zero-angle assumption is often rolled into equations that calculate the pose, compounding error and inaccuracy of such pose. For instance, during braking or acceleration when the robot vehicle pitches forwards or backwards, the zero angle assumption negatively impacts pose determination. In an attempt to reduce such error, heuristics are often incorporated in the pose estimation, but such error reduction using this method is limited.

To provide more accurate pose determinations, the disclosed pose systems include ride height sensors coupled to the wheels (e.g., all four wheels) to collect and determine data that associates the robot vehicle, the road, and data related to the road, vehicle, or components thereof (e.g., angles, distances, velocities, etc.). In embodiments, a minimum of three ride height sensors on different wheels are provided to unambiguously determine road angle with respect to both pitch and roll.

In general, a ride height sensor, an IMU, and a GPS are connected to a robot vehicle. The robot vehicle includes a computer that processes data and executes instructions stored on memory for effectuating calculations or other problem-solving operations for determining precise positioning (e.g., pose) of the robot vehicle with respect to a road surface. Each of the ride hide sensor, the IMU, and the GPS may collect data to effectuate such determinations. The collected data is processed via a computing device (e.g., one or more processors, controllers, chips, etc., thereof), which is configured to implement algorithms/instructions for determining pose of the robot vehicle.

As used herein, the term "front" refers to a front portion of the robot vehicle (see FIG. 4), and the term "back" refers to the back portion of the robot vehicle, where front and back are determined from an observation point disposed a distance away from the vehicle. It should also be appreciated that, spatial terms such as "vertical", "horizontal", "upper" and "lower" or the like may be used in conjunction with the drawings herein; however, robot vehicles are used in many orientations and positions, and these terms are neither limiting nor absolute, but are merely used for convenience and clarity.

As used herein, the term "chassis" includes a base, a frame (e.g., a lower portion thereof), or skeleton of a robot vehicle or other conveyance system.

Provided herein is a delivery system including a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, a single securable compartment or multiple securable compartments to hold objects (e.g., goods), a controller configurable to associate each of the securable compartments to an assignable customer or a customer group within a marketplace, or provider and provide entry when authorized, a communication module, a control module, and a processor configured to manage the conveyance system, the navigation module, the sensor system, the communication module, the control module and the controller. As can be appreciated, any of these components and/or modules can be provided in any number (e.g., one or more).

As used herein, the term "autonomous" includes fully-autonomous, semi-autonomous, driverless, and any configuration in which a vehicle can operate in a controlled manner for a period of time without human intervention.

As used herein, the term "fleet," "sub-fleet," and like terms are used to indicate a number of mobile machines or vehicles including land vehicles, watercraft, and/or aircraft operating together or under the same ownership. In some embodiments, the fleet or sub-fleet is engaged in the same activity. In various embodiments, the fleet or sub-fleet are engaged in similar activities. In certain embodiments, the fleet or sub-fleet are engaged in different activities.

As used herein, the term "robot," "robot vehicle," "robot fleet," "vehicle," "all-terrain vehicle," "multi-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the term "compartment," which may include a "sub-compartment," is used to indicate an internal bay of a robot vehicle. In embodiments, the compartment may have a dedicated door, for example, at the exterior of the vehicle for accessing the bay, or portions thereof, and/or interior of the vehicle for access the bay, or portions thereof. In various embodiments, compartment may indicate an insert secured within the bay, or portions thereof.

As used herein, the term "sub-compartment" is used to indicate a subdivision or portion of a compartment.

As used herein, the term "user," "operator," "fleet operator," "manager," and like terms are used to indicate the entity that owns or is responsible for managing and/or operating the robot fleet, or portions thereof.

As used herein, the term "customer" and like terms are used to indicate the entity that requests the services provided by the robot fleet.

As used herein, the term "provider," "business," "vendor," "third party vendor," and like terms are used to indicate an entity that works in concert with the fleet owner or operator to utilize the services of the robot fleet to deliver the provider's product from, and/or return the provider's product to, the provider's place of business or starting or storing location.

As used herein, the term "server," "computer server," "central server," "main server," and like terms are used to indicate a computing device (e.g., computer) or device on a network that manages the fleet resources, namely the one or more of the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein, the controller is commonly used for managing access to components of the robot such as the securable storage compartments.

As used herein, a "mesh network" is a network topology in which each node relays data for the network. All mesh nodes cooperate in the distribution of data in the network. It can be applied to both wired and wireless networks. Wireless mesh networks can be considered a type of "wireless ad hoc" network. Thus, wireless mesh networks are closely related to Mobile ad hoc networks (MANETs). Although MANETs are not restricted to a specific mesh network topology, wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein, the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, an OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

Pose System

Figure 2:
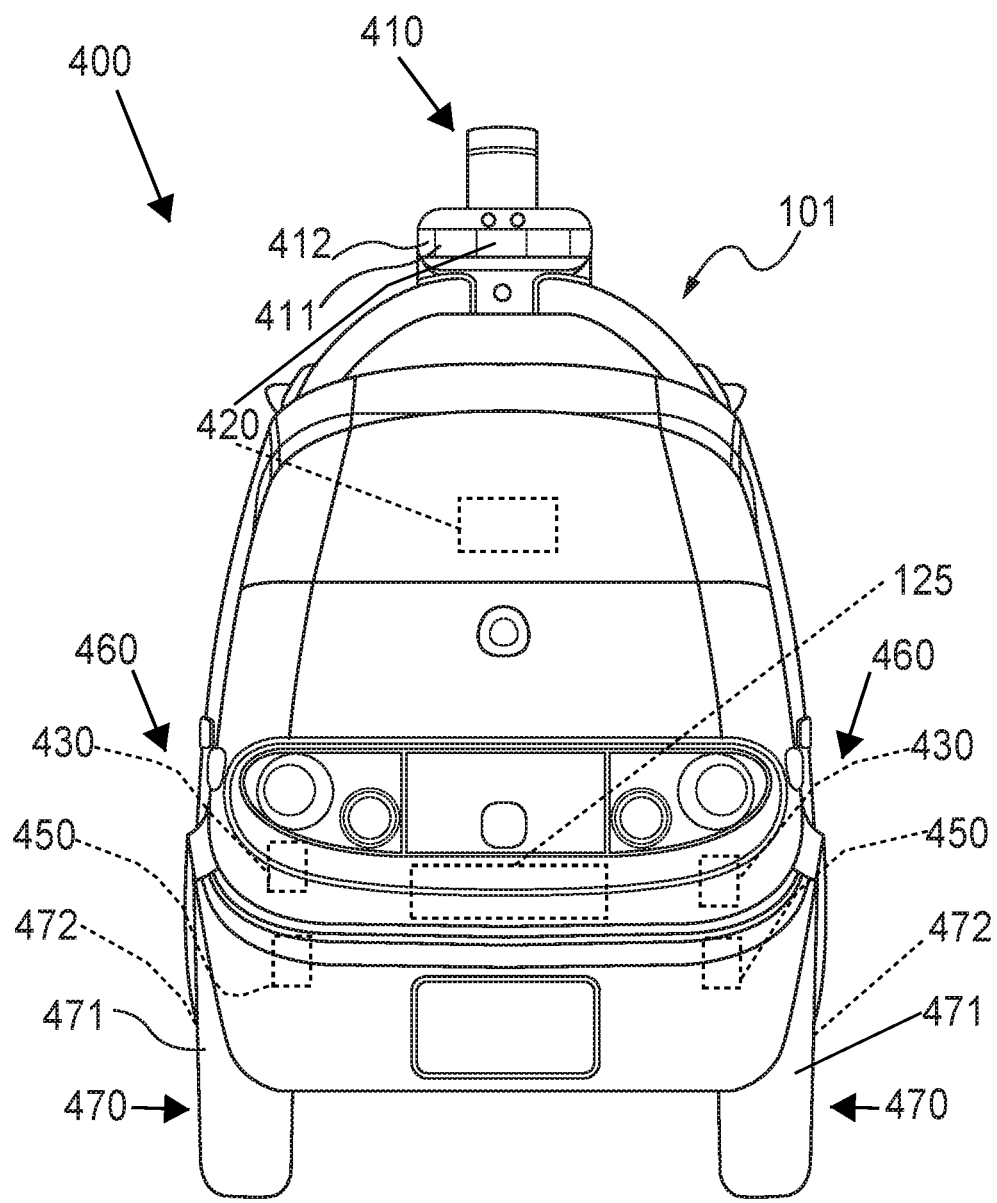
FIG. 2 is a front view of the robot vehicle of FIG. 1.
Figure 3:
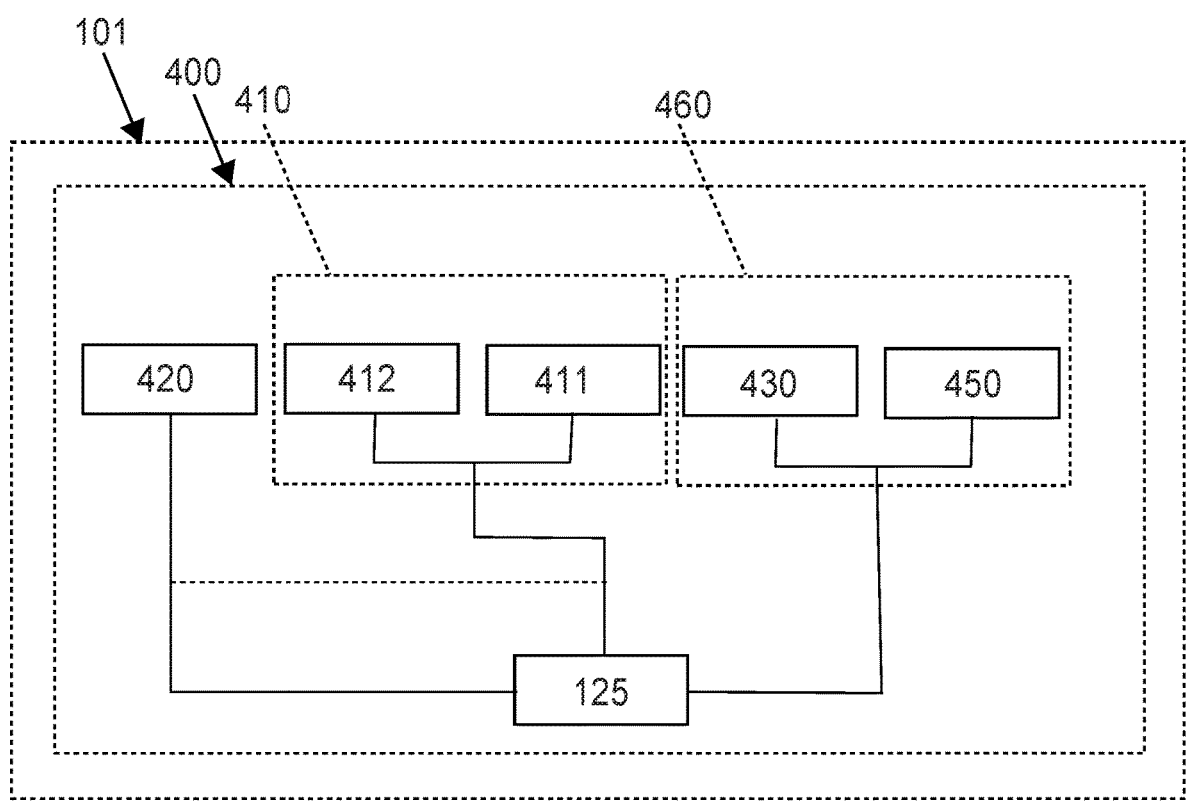
FIG. 3 is a diagram illustrating a pose system of the robot vehicle of FIG. 1.

With reference to FIGS. 1-3, an automated robot vehicle or vehicle 101 having a pose system 400 is illustrated. Each vehicle 101 includes one or more wheel assemblies 460 (e.g., four wheel assemblies, although any number of wheel assemblies 460 may be provided), and a suspension system 462 that couples the wheel assemblies 460 to the chassis 99 of vehicle 101. Each wheel assembly 460 includes a wheel 470 that is movably coupled (e.g., vertically movable) to the chassis 99 of vehicle 101 via suspension system 462, which may include one or more suspension arms or linkages (not shown) for each respective wheel 460 and/or wheel assembly 470. As can be appreciated, each wheel 470 or wheel assembly 460 can be independently movable relative to the other wheels 470/wheel assemblies 460 and/or movable with one or more of the other wheels 470/wheel assemblies 460.

The pose system 400 of vehicle 101, which is configured to generate a coordinate system within an environment (e.g., the world), so that pose system 400 can provide the position and/or location of the vehicle 101 and the orientation of the vehicle 101 in the coordinate system via the assistance of one or more ride height sensors 450 (RHS 450) coupled to the suspension system 462 of the pose system 400. Indeed, the pose system 400 provides (e.g., electronically publishes at a rate of about between about 100-300 Hz, and in some embodiments 200 Hz) a real-time estimate of a position and orientation of the vehicle 101 on an electronic map (not shown) to indicate where the vehicle 101 is in the coordinate system to position and orient the vehicle 101 relative to objects in the coordinate system. To facilitate the determination of the position and orientation of the vehicle 101, the pose system 400 further includes a global positioning system 420 (GPS 420), an inertial measurement unit 410 (IMU 410), and a wheel speed sensor 430 (WSS 430). In general, the GPS 420 provides an estimated location within the coordinate system. The IMU 410 provides an angular velocity (e.g., turning) of vehicle via a gyroscope thereof and gravitational direction, vehicle orientation, and vehicle acceleration via an accelerometer thereof. The WSS 430 provide vehicle velocity. The GPS 420, WSS 430, IMU 410, and RHS 450 are operably coupled (e.g., wired or wirelessly) with a computing device and/or processor 125, as seen in FIG. 3 to enable data from these sensors to be associated and analyzed to determine vehicle pose.

Each wheel assembly 460 of pose system 400 can include one or more RHS 450 coupled to suspension system 462 of vehicle 101, one or more WSS 430, and a wheel 470 to which the one or more WSS 430 are coupled 430. Each wheel 470 of wheel assembly 460 may include a tire 471 and a rim 472. The WSS 430 collects data associated with the speed of the wheel 470 (e.g., rotation rate). In embodiments, the processor 125 can determine the average wheel speed of more than one wheel 470 as measured by the speed of a motor (not shown) of vehicle 101.

Turning now to FIGS. 4 and 5, the RHS 450 of wheel assembly 460 is an electronic device (e.g., a potentiometer) that can be coupled to the wheel 470, the suspension 462 and/or the chassis 99 (see e.g., FIG. 5a) of the vehicle 101 to measure wheel displacement (and/or suspension displacement) of one or more wheels 470 of the vehicle 101 relative to the vehicle 101. In particular, the RHS 450 collects data associated with wheel displacement relative to a chassis 99 (or body) of vehicle 101 to determine an angle of a drivable surface (e.g., a road RD, path, driveway, parking lot, etc.) with respect to the vehicle 101 for establishing a pose of the vehicle 101 while the vehicle 101 is positioned on the drivable surface. For clarity and convenience, a road surface or road RD will be used herein. Wheel displacement is generally noted as rx (e.g., r1, r2, r3, and r4, with each iteration corresponding to one of the respective wheels 470).

In some embodiments, a first portion of the RHS 450 can be connected to the chassis 99 and a second portion of the RHS 450 can be connected to the suspension 462 and/or wheel 470 of vehicle 101. As the vehicle 101 moves over various terrain or road surfaces, the suspension system 462 will travel vertically (up and down) so that RHS 450 (e.g., a sensor arm thereof- not shown) measures the wheel displacement based on the vertical movement.

The IMU 410 of pose system 400 can include at least one gyroscope 411, an accelerometer 412, and/or a magnetometer (not shown) to determine, for instance, angular velocity and/or gravitational direction. For instance, the IMU 410 collects inertial measurement data associated with the vehicle 101 such as angular velocity via the gyroscope 411 and the IMU 410 collects data associated with an Earth gravity vector and acceleration of the vehicle 101 via an accelerometer 412. In embodiments, the IMU 410 may include GPS 420 (or the GPS 420 may be separate from the IMU 410). The IMU 410 is shown disposed at the top of the vehicle 101, or in other words, disposed at an end which is opposed to the chassis 99 of the vehicle 101, but may be positioned anywhere on the vehicle 101. The IMU 410 is configured to determine a rotation matrix R of vehicle 101, which can be considered to be three vectors: one that points forward along the vehicle's x-axis, one vector that points along the y-axis, and one vector that points along the z-axis. The rotation matrix R provides not only the forward direction, but also the orientation of the vehicle, for example, the rotation matrix R provides pitch, roll, and/or yaw.

With reference to FIGS. 1-5, the pose of vehicle 101 can be determined by collecting data from the IMU 410, the GPS 420, the WSS 430, and the RHS 430. Advantageously, pose system 400 is configured to determine the angle of the road with respect to the vehicle 101 to more accurately establish pose of the vehicle 101.

Indeed, the pose system 400 is configured to provide a more accurate pose of the vehicle 101 when compared to a system not having pose system 400, particularly when the vehicle 101 is moving such that the suspension system 462 thereof is not in resting position or moving perpendicular to the road RD (vertically).

Briefly, if a vehicle is traveling along a substantially flat road RD or is resting and disposed parallel to a substantially flat road RD, the X vector of rotation matrix R of the vehicle would be substantially parallel to a travel vector T of the vehicle, which is a three dimensional (3D) direction of travel vector of vehicle 101, as seen in FIG. 4 where the suspension of the vehicle is assumed to be rigid. In such a situation, the chassis 99 is parallel to the road RD, and a pose may be easily obtained since X vector of rotation matrix R is parallel or substantially parallel to travel vector T such that they can be accurately assumed to be parallel. If the assumption that X vector of rotation matrix R and travel vector T are parallel is made when the vehicle is moving along an uneven road surface or where the vehicle is bouncing (e.g. when one of the four wheels of the vehicle 101 goes over a speed bump, when the vehicle 101 moves up hill, etc.), a final determination of a pose may be inaccurate since X vector of rotation matrix R and travel vector T are likely not parallel or substantially parallel in such circumstances.

To limit such inaccuracies, pose can be computed by estimating the direction of the travel vector T via integrations (for instance, by including incoming data from an accelerometer). However, when vehicle 101 is moving, these integrations may be subjected to drift because of errors in acceleration, and therefore a determination of the orientation of a travel vector T may still be inaccurate, still resulting in an inaccurate pose determination. In other words, pose determination with such methodology is based on inaccurate estimations of velocity vector v and position vector p, where the velocity vector v represents the 3D velocity of vehicle 101 in Earth coordinates, and the position vector p represents the 3D position of vehicle 101 in Earth coordinates. Velocity vector v determinations depend on travel vector T (where v=T), and position vector p=∫v·dt. If a travel vector T is inaccurate, velocity and position vectors v and p will also be inaccurate.

Consequently, and to further minimize or avoid errors and inaccuracy, the pose system 400 of this disclosure, which incorporates ride height sensors and data therefrom, may be implemented. For example, to improve of the accuracy of pose determinations of vehicle 101 for circumstances for when the X vector of rotation matrix R and travel vector T are not parallel, cannot be assumed to be parallel, and/or for instances when an improvement of performance of vectors v and p is required, the pose system 400 provides the most accurate technology for making pose determinations since pose system 400 provides the capacity to determine the angle of the road with respect to the vehicle 101. In particular, pose system 400 collects wheel displacement data and, in conjunction with other data, determines a more precise vehicle pose for more accurately determining position and orientation of the vehicle 101 within the coordinate system.

Besides wheel displacement data, pose system 400 utilizes a variety of data to determine the pose of vehicle 101. For example, pose system 400 utilizes wheel data from wheels 470. Such wheel data can include radius "WR" (FIG. 1) of the wheel 470, which may be predetermined (e.g., via traditional measuring tools like a measuring tape, calipers, etc.) or continuously measured via sensors (not shown) coupled to the wheels where such sensors are operatively coupled to pose system 400 so that the robot processor 125 can establish wheel radius through, for instance, arc length determinations via real-time computations since tire pressures may change over time. Traditional angular velocity formulas and/or combinations thereof may be utilized to aid in the determination and/or computations of data associated with determining the pose of wheel 470 and/or the pose of vehicle 101. As noted above, wheel data can include the wheel speed "w" (a scalar unit in rad/s) of wheel 470, which may be determined via the WSS 430, location and velocity data of vehicle 101, which can be determined via the GPS 420 of vehicle 101, and angular velocity data, gravitational direction data, and vehicle orientation data, which can be determined via the IMU 410 of vehicle 101.

Figure 6:
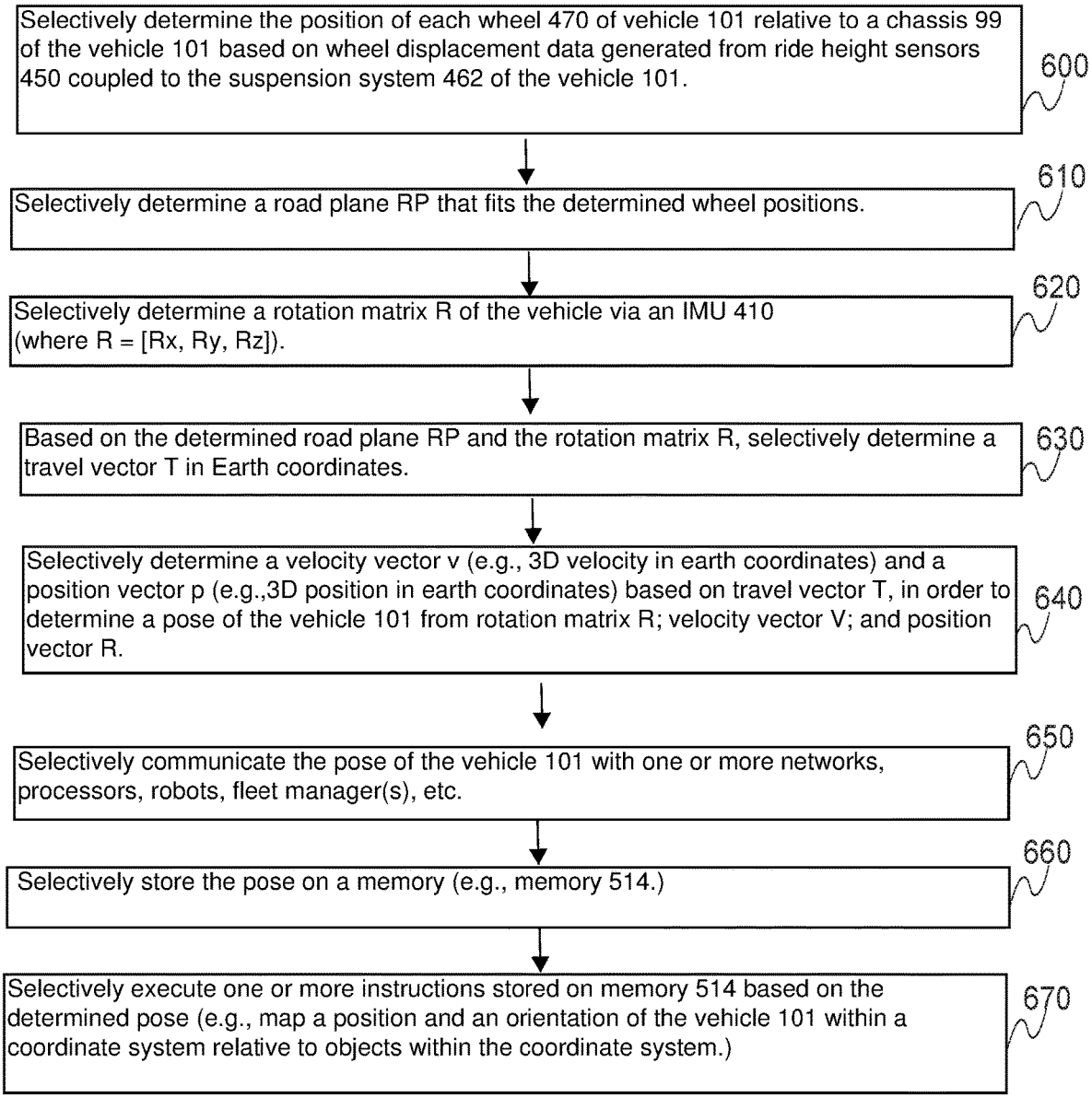
FIG. 6 is an exemplary flowchart which depicts a logic flow process associated with the robot vehicle of FIG. 1.

Turning now to FIG. 6, in order to determine pose with pose system 400, the processor 125 collects data from the pose system 400 including the wheel assembly 460, the GPS 420, and the IMU 410 so that the processor 125 of vehicle 101 receives and analyzes the collected data (e.g., global positioning data, wheel speed data, ride height data, etc.) for outputting and/or storing the pose based on a determined angle of the road with the respect to the vehicle 101.

In step 600, the processor 125 receives wheel position/ride height data of each wheel 470 of vehicle 101 with respect to the vehicle chassis 99 of vehicle 101 so that processor 125 can determine: wheel displacement, rx (a difference in height between a respective one of the wheels 470 and the chassis 99 of vehicle 101 for each respective wheel); w, which is wheel speed of each respective wheel; WR, which is radius of each respective wheel; and t, which is time or period in which a wheel rotates 360 degrees. Notably, each r of rx can be a distance/height measured from a predetermined point of the wheel (e.g., center, bottom, top) to a bottom of the chassis 99, for example.

In step 610, the processor 125 determines a road plane RP that fits the above determined wheel positions of all the wheels (e.g., a plane that contacts a bottom surface of each wheel such as at the outermost diameter of the tire tread of the wheel where the tire would contact ground) based on the wheel positions of each wheel 370 as determined by wheel displacement rx. For example, with a wheel position of each wheel established, the road plane is determined based on a plane that would simultaneously extend through all those wheel positions (e.g., all four wheels of vehicle 101).

In step 620, the processor 125 determines a rotation matrix R, which is an orientation of the vehicle (e.g. pitch, roll, yaw based on any x, y, z coordinate system) from data determined by the IMU 410, where R=[Rx, Ry, Rz] (see FIGS. 4 and 5). As can be appreciated, this can be effectuated before, during, and/or after the previous steps 600, 610.

In step 630, with the determined road plane RP and the rotation matrix R, the processor 125 determines a travel vector T (see FIGS. 4 and 5), which is a three dimensional (3D) direction of travel vector of vehicle 101, where |T| is proportional to w, in Earth coordinates, where |T| is an absolute value of travel vector T and w is angular velocity or wheel rotation rate. In other words, the length of the travel vector T is proportional to (i.e., a constant multiplied by) the wheel rotation rate w. The processor 125 is configured to determine measurements from the ride height sensors (e.g., RHS 450), and is configured to estimate travel vector T relative to rotation matrix R using a standard plane fitting calculation. For example, utilizing ride height sensor values h1, h2, h3 for wheels at positions c1, c2, c3 with respect to the x, y, z coordinate system of the robot vehicle 101, the processor 125 is configured to compute a, b, c such that $c1z-h1=ac1x+bc1y+c$ (and similarly for c2, c3) so that travel vector T can be computed as [1, 0, a+c].

In step 640, the processor 125 determines the pose of the vehicle 101, which may be computed to a first approximation, $v=T$ and $p=\int T \cdot dt$, and where v is the 3D velocity of vehicle 101 in Earth coordinates and p is the 3D position of vehicle 101 in Earth coordinates so that the pose of vehicle 101 is defined by the R, v , and p. As can be appreciated, the processor 125 (or other processor or computing device operably coupled to robot vehicle 101) can be utilized to effectuate such computations and determinations. In steps 650, 660, the determined pose of the vehicle 101 can be stored on memory (e.g., memory 514) and/or selectively communicated with one or more networks, processors, robots, flee manager(s), etc.

Figure 7:
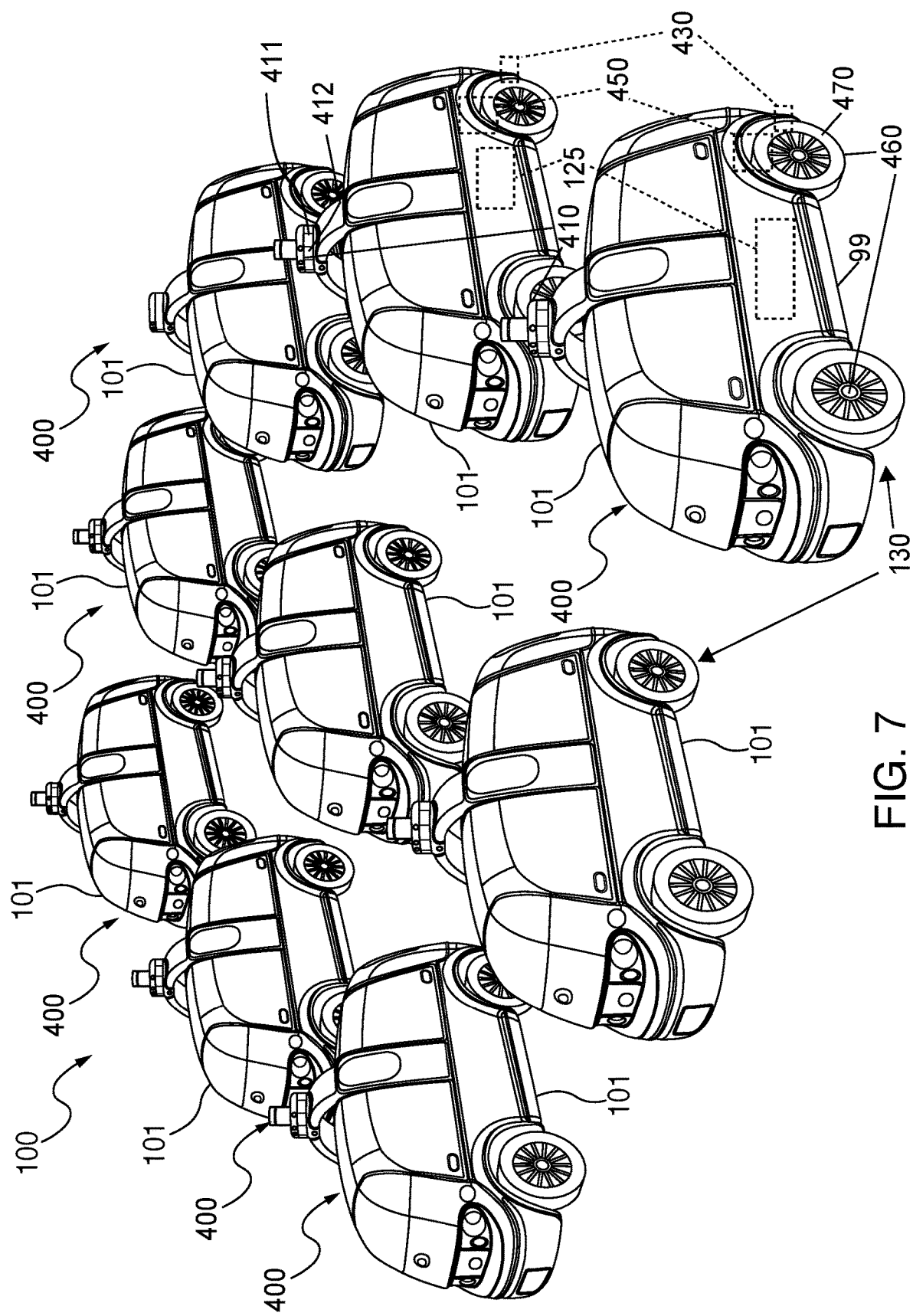
FIG. 7 is a perspective view of an autonomous robot fleet in accordance with the principles of this disclosure.

In step 670, based on the determined pose, one or more additional instructions/algorithms can be executed by processor 125. For example, information regarding the determined pose can be utilized to inform fleet manager, customer, repair location, etc., of precise timing related arrival, departure, etc. in real-time. Such information/data can also be used to determine accurate condition, location, efficiency, etc. of one or more robot vehicles 101 in a fleet 100 of robot vehicles 101 (see FIG. 7) relative to one another, destinations, reference points/locations, etc. Any number of such robots 101 in fleet 100 may include pose system 400 having any suitable hardware and/or software components consistent with this disclosure.

Conveyance Systems

With reference to FIGS. 7-10, each vehicle 101 in the fleet 100 includes a conveyance system 130 that includes a drive system with, for example, a propulsion engine, wheels, treads, wings, rotors, blowers, rockets, propellers, brakes, etc. Conveyance system 130 can include the body, chassis, and/or other components of the vehicle 101 that support one or more components, systems, modules, etc. of the vehicle 101 to facilitate transportation of the vehicle and/or delivery of goods or other items supported by the vehicle.

As noted previously, the robot fleet 100 is configurable for land, water, and/or air. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land, and water types), unmanned aircraft, and unmanned spacecraft.

In one exemplary embodiment, a vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the vehicle 101 could be configured with an auxiliary solar power system 135 to provide back-up emergency power or power for minor low-power sub-systems.

Alternative configurations of components to a total drive system with a propulsion engine could include wheels, treads, wings, rotors, blowers, rockets, propellers, brakes, etc.

In some embodiments, the robot fleet 100 is configured for water travel as a watercraft with a propulsion system (engine) that is configurable as a gas engine, a turbine engine, an electric motor and/or a hybrid gas/electric engine and is further configured with a propeller.

In some embodiments, the robot fleet 100 is configured for hover travel as an over-land or over-water hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

In some embodiments, the robot fleet 100 is configured for air travel as an aerial drone or aerial hovercraft and is configured with wings, rotors, blowers, rockets, and/or propellers and an appropriate brake system. The propulsion system (engine) is configurable as a gas engine, a turbine engine, an electric motor and/or a hybrid gas/electric engine.

The Power System

In some embodiments, each vehicle 101 of the robot fleet 100 is configured with one or more power sources, which include a power system 135 (e.g., battery, solar, gasoline, propane, etc.).

Navigation Module

Each vehicle 101 in the fleet 100 further includes a navigation module 140 (for navigation in the unstructured open or closed environments (e.g., digital maps, HD maps, GPS, etc.). In selected embodiments, the navigation module 140 may replace or may complement the above noted GPS 420 and it may further assist determining a pose of a vehicle 101. In some embodiments, the fleet 100 relies on maps generated by the user, operator, or fleet operator, specifically created to cover the intended environment where the vehicle 101 is configured to operate. These maps would then be used for general guidance of each vehicle 101 in the fleet 100, which would augment this understanding of the environment by using sensor system 170, which can include a variety of on-board sensors such as cameras, LiDAR, altimeters or radar to confirm its relative geographic position and elevation.

In some embodiments, for navigation, the fleet 100 of robots 101 uses internal maps to provide information about where they are going and the structure of the road environment (e.g., lanes, etc.) and combines this information with onboard sensors (e.g., cameras, LiDAR, radar, ultrasound, microphones, etc.) and internal computer processing to constantly determine where the robots 101 can safely navigate, what other objects are around each vehicle 101 and what they may do. In still other embodiments, the fleet 100 incorporates on-line maps to augment internal maps. This information is then combined to determine a safe, robust trajectory for the vehicle 101 to follow and this is then executed by the low level actuators on the vehicle 101.

In some embodiments, the fleet 100 relies on a global positioning system (GPS) that allows land, sea, and airborne users to determine their exact location, velocity, and time 24 hours a day, in all weather conditions, anywhere in the world.

In some embodiments, the fleet 100 of robots 101 will use a combination of internal maps, sensors and GPS systems to confirm its relative geographic position and elevation.

In some embodiments, the autonomous fleet 100 is strategically positioned throughout a geographic region in anticipation of a known demand.

Over time, a fleet operator (not shown) and/or a vendor 204 can anticipate demand for robot services by storing data concerning how many orders (and what type of orders) are made at particular times of day from different areas of the region. This can be done for both source (e.g., grocery stores, restaurants, warehouses, general businesses, etc.) and destination (e.g., customer, other businesses, etc.). Then, for a specific current day and time, this stored data is used to determine what the optimal location of the fleet 100 is given the expected demand. More concretely, the fleet 100 can be positioned to be as close as possible to the expected source locations, anticipating that these source locations will be the most likely new orders to come into the system. Even more concretely, it is possible to estimate the number of orders from each possible source in the next hour and weigh each source location by this number. Then one can position the fleet 100 so that the fleet 100 optimally covers the weighted locations based on these numbers.

In some embodiments of the robot fleet 100, the positioning of robots 101 can be customized based on: anticipated use, a pattern of historical behaviors, or specific goods being carried.

Sensor Systems

As noted previously, each vehicle 101 can be equipped with a sensor system 170 (FIG. 9), which includes at least a minimum number of onboard sensors such as cameras (for example, those running at a high frame rate akin to video), LiDAR, radar, ultrasonic sensors, microphones, etc.) and internal computer processing or it may be connect to the processor 125 to constantly determine where it can safely navigate, what other objects are around each vehicle 101, and what it may do within its immediate surroundings.

In some embodiments, sensor system 170 includes sensors for conveyance system 130 configured to: monitor drive mechanism performance (e.g., the propulsion engine); monitor power system 135 levels (e.g., battery, solar, gasoline, propane, etc.); or monitor drive train performance (e.g., transmission, tires, brakes, rotors, etc.).

Communications Module

Figure 8:
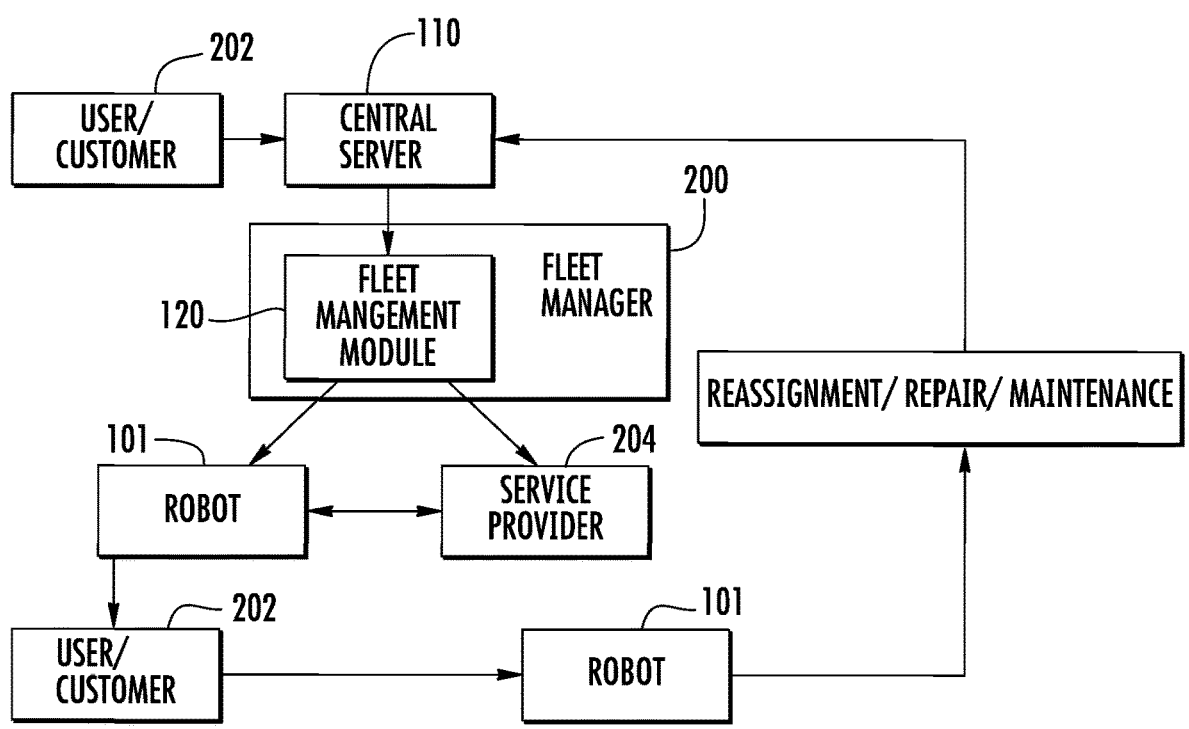
FIG. 8 is an exemplary flowchart representation of logic flow for fleet management of the autonomous robot fleet of FIG. 7.
Figure 9:
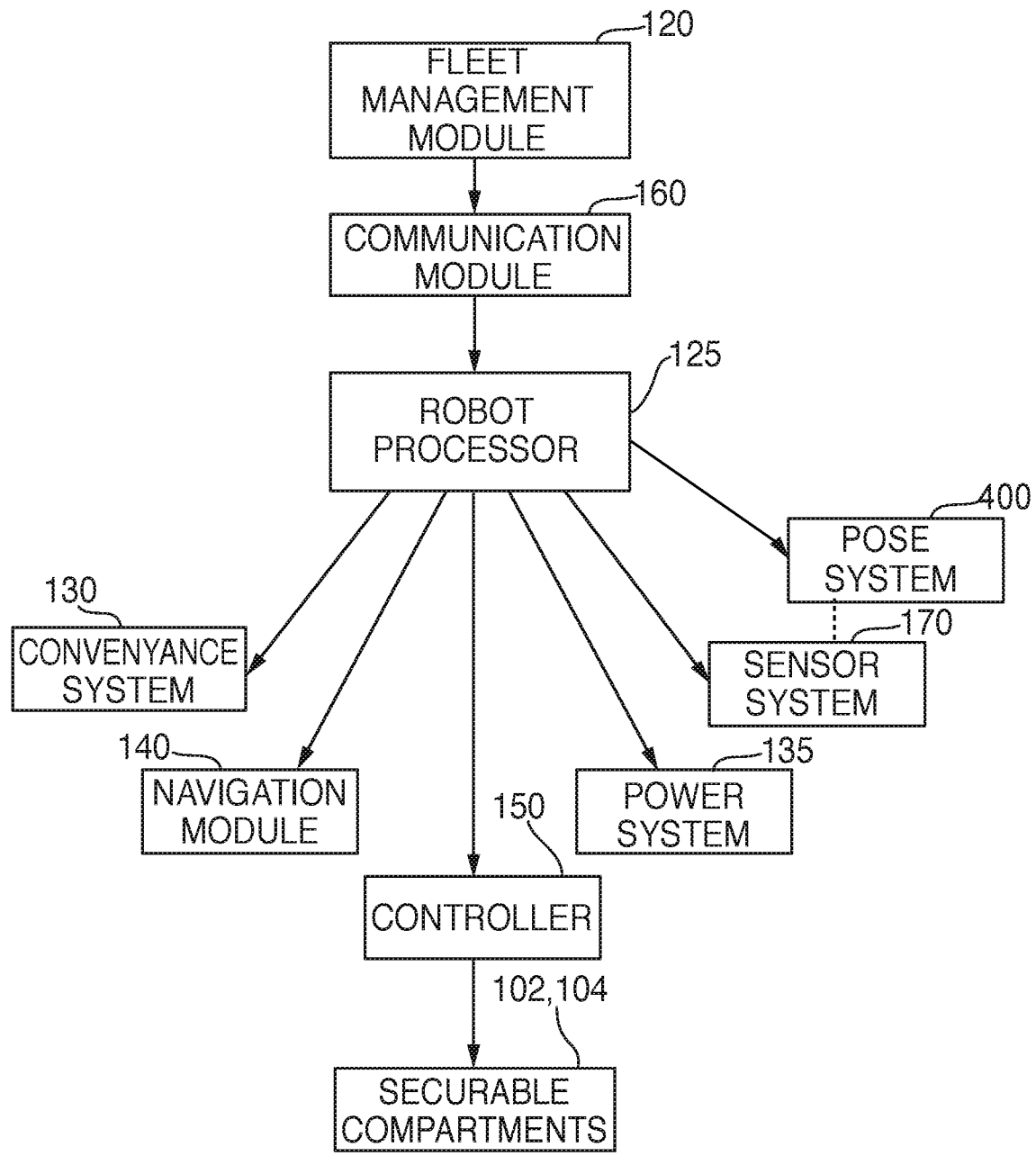
FIG. 9 is an exemplary flowchart representation of logic flow from a fleet management control module to various systems and modules of the robot vehicle of FIG. 1.
Figure 10:
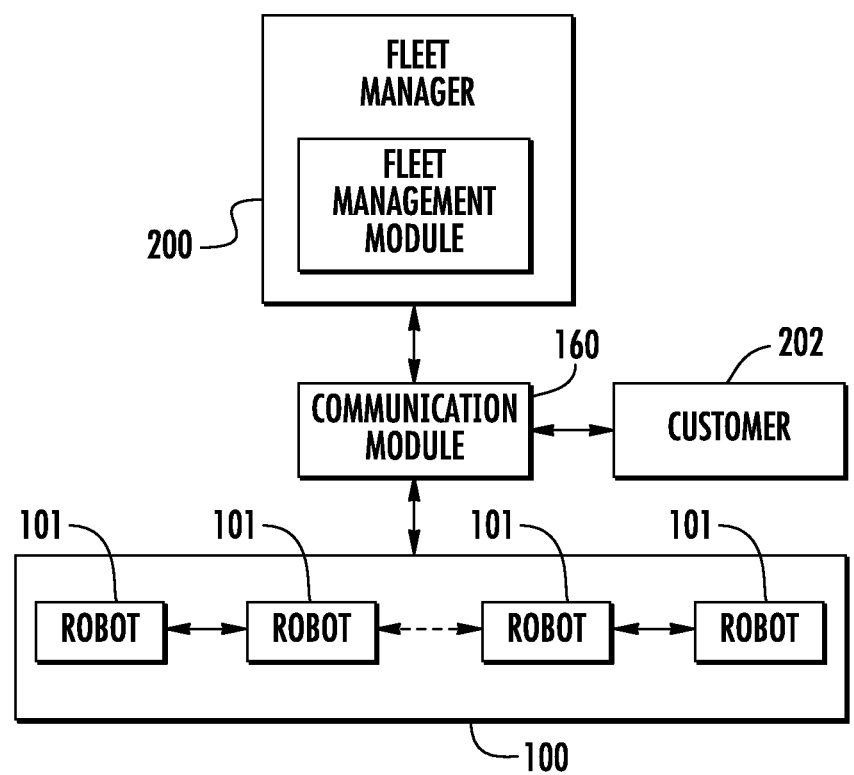
FIG. 10 is an exemplary flowchart representation of logic flow through a communications module of an autonomous vehicle system.

With reference to FIGS. 8-10, each vehicle 101 in the fleet 100 further includes a communication module 160 configurable to receive, store and send data to the fleet management module 120, to a user, to and from the fleet management module 120, and to and from the robots 101 in the fleet 100. In some embodiments, the data is related to at least operator (not shown) interactions and the robot fleet 100 interactions, including, for example, scheduled requests or orders, on-demand requests or orders, or a need for self-positioning of the robot fleet 100 based on anticipated demand within the unstructured open or closed environments.

In some embodiments, each vehicle 101 in the fleet 100 includes at least one communication module 160 configurable to receive, store and transmit data, and to store that data to a memory device (not shown), for future data transfer or manual download.

In some embodiments, a provider 204 and a customer 202 has their own app/interface to communicate with the fleet operator (not shown) (e.g., "Nuro customer app" for customers on their phone, "Nuro vendor app" for businesses on a tablet or phone or their internal computer system, etc.).

In some embodiments, communication to the operator (not shown) and the robots 101 in the fleet 100, between the robots 101 of the fleet 100, and between the operator (not shown) and the robots 101 in the fleet, occurs via wireless transmission.

In some embodiments, the operator's 200 wireless transmission interactions and the robot fleet 100 wireless transmission interactions occur via mobile application transmitted by an electronic device (e.g., cell phone, tablet, etc.) and forwarded to the communication module via: a central server 110, a fleet management module 120, and/or a mesh network.

In some embodiments, one preferred method of communication is to use cellular communication between the fleet manager 200 and fleet 100 of robots 101, (e.g., 3G, 4G, 5G, or the like). Alternatively, the communication between the fleet control module 120 and the robots 101 could occur via satellite communication systems. In some embodiments, a customer 202 uses an app (either on a cellphone, laptop, tablet, computer or any interactive device) to request a service (e.g., an on-demand order or for a mobile marketplace robot to come to them such as for returning a grocery item, for example).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

Controller(s) and Processor(s)

Figure 11:
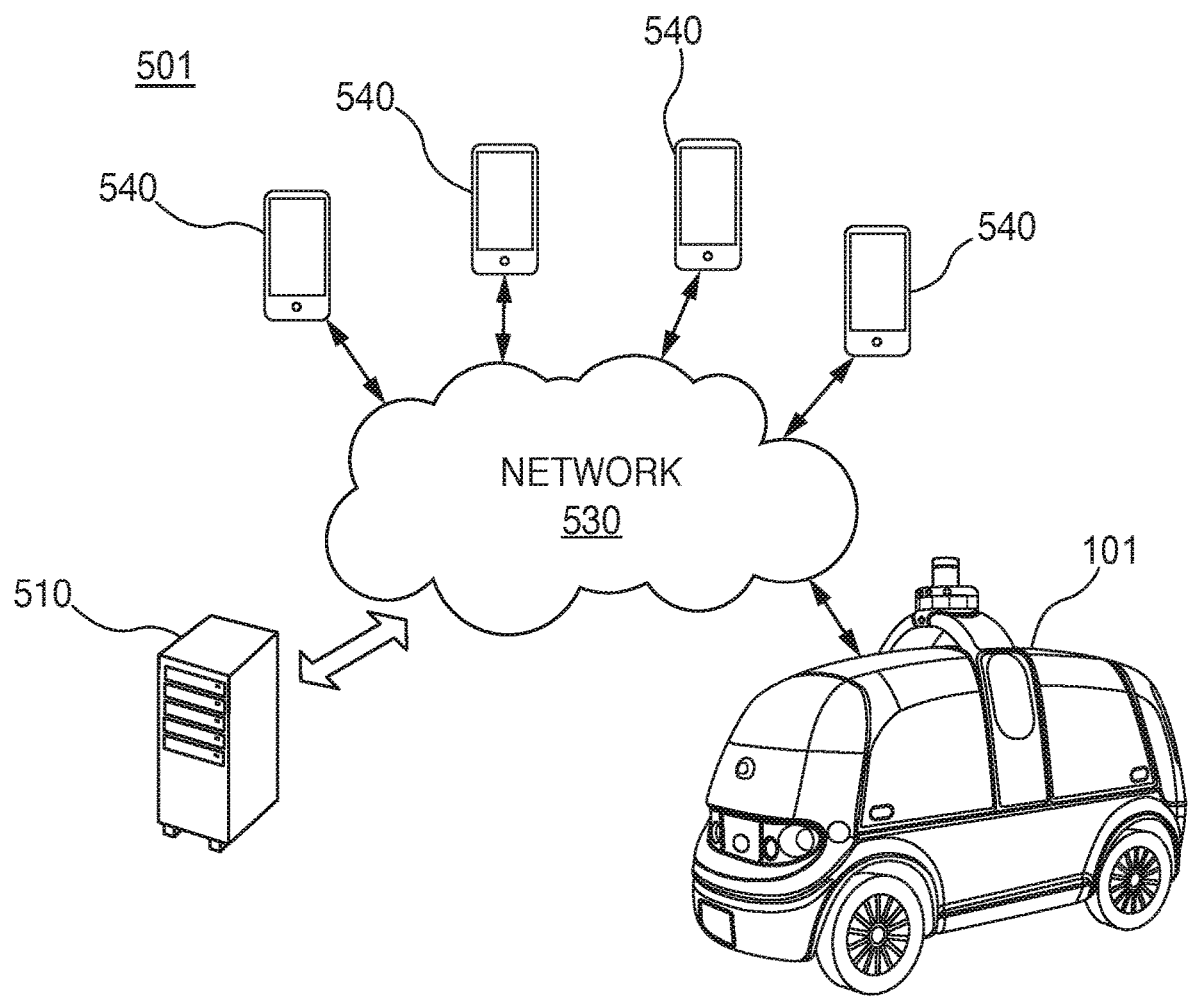
FIG. 11 is a diagram of an exemplary networked environment of an autonomous vehicle system of this disclosure.
Figure 12:
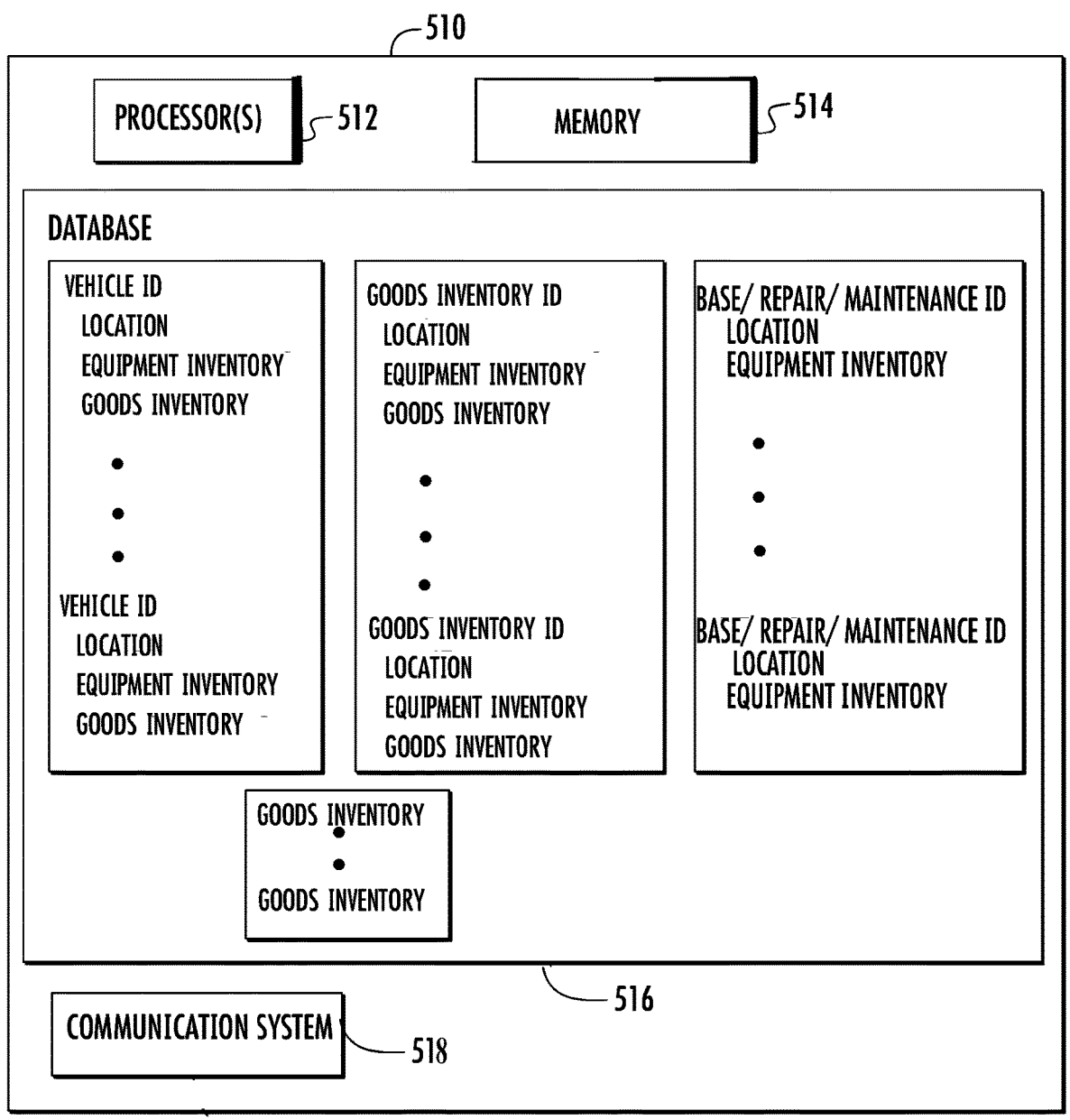
FIG. 12 is a block diagram of exemplary components of a delivery server for the autonomous vehicle management system of this disclosure.

In accordance with aspects of this disclosure, and with reference to FIGS. 11 and 12, a delivery management system 510 is provided that receives Internet orders and communicates the orders to robots 101 for delivery of items to delivery destinations. In particular, the following will now describe control and processing in connection with managing delivery of items by robots 101 en route to a destination.

One embodiment of a delivery system 501 can include one or more servers 510 (e.g., delivery management server) that are in communication with a network 530, which can include any network technology including, for instance, a cellular data network, a wired network, a fiber optic network, a satellite network, and/or an IEEE 802.11a/b/g/n/ac wireless network, among others. Customer devices 540 can communicate with the server 510 through the network 530. A customer device 540 can be any electronic device described herein or not described herein, including smartphones, tablets, laptops, desktop computers, set-top boxes, smart watches, or another device.

In accordance with one aspect of this technology, the customer devices 540 can use software applications to communicate with the server 510. In various embodiments, the software application can be a mobile app, a web browser that loads a particular URL, or a standalone computer application, among other things. The software application can include a menu or listing of items and can permit an order to be completed specifying desired items and a delivery destination. The software application on the customer devices communicates the order to the server 510, which receives the order and communicates it to one or more robots 101.

Figure 13:
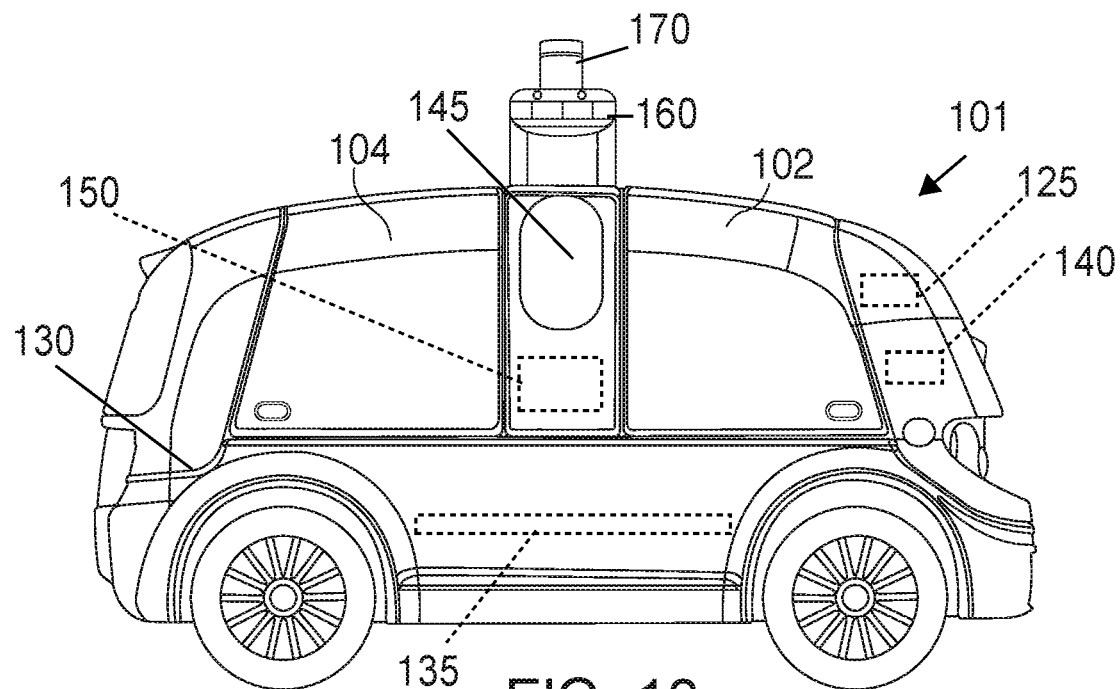
FIG. 13 is a right, side view of the robot vehicle of FIG. 1.

As seen in FIG. 12, there is shown a block diagram of exemplary components of the delivery management server 510, including one or more processor(s) 512, one or more memory 514, a database 516, and a communication system 518. The memory 514 can store instructions for execution by the processor(s) 512 to carry out the operations described herein. The communication system 518 can operate to receive orders from software applications and can communicate with the robots 101. The database 516 can store the orders and can also store information for each of the robots 101, including, for example, vehicle ID, storage/staging ID, base /repair/maintenance station ID, locations, equipment inventory, goods inventory etc. Different robots 101 may have different equipment and goods offerings. Likewise, storage locations may have different offerings such as general grocery items at one location (e.g., eggs, milk, cereal) or specialty offering at another location (e.g., liquor, balloons, cards, merchandise, etc.) This information is stored in the database 516 of the server 510. The database 516 can also store the location of vehicle 101 and/or the various customer, vendor, repair shop locations, equipment, etc. As described above herein, each vehicle 101 can include GPS 420 navigation capability. The autonomous robots 101 can communicate their locations to the server 510, which can store the location information in the database 516. The listing of database information in FIG. 13 is exemplary and other information regarding orders or robots 101 can be stored in the database 516.

With continuing reference to FIG. 12, when the server 510 receives an order, the server 510 determines which robots 101 may be capable of fulfilling the order. The delivery management system 510 can access the database 516 to access the equipment inventory and goods/services inventory for the autonomous vehicle 101, and to determine which vehicle 101 include the ordered item/service and the appropriate equipment for handling, transporting, delivering, etc. the goods/services. In various embodiments, the server 510 can additionally access the location of each vehicle 101.

In various embodiments, the server 510 can communicate the order to one or more of the eligible vehicle 101 that include the goods/services and the necessary modules for delivering/handling such goods/services. In various embodiments, the server 510 can assign the order to the eligible vehicle 101 that is closest to the delivery destination. In various embodiments, the server 510 can assign the order to the eligible vehicle 101 that has the fewest number of orders. In various embodiments, the server 510 can assign the order to the eligible vehicle 101 that has the optimal balance of distance and number of orders for delivery. In various embodiments, the server 510 can communicate the order to one or more eligible robots 101, and each eligible vehicle 101 can either accept the order or reject the order. In various embodiments, the server 510 can broadcast the order to all eligible robots 101, and the eligible robots 101 can respond with a "bid" for the order, such that the vehicle 101 with the highest bid can be assigned the order. In various embodiments, a vehicle 101 that is assigned an order can respond to the server 510 with a delivery time estimate for the order, and the server 510 can communicate the time estimate to the customer device 540. The various ways of assigning an order to vehicle 101 are exemplary, and other ways of assigning an order to a vehicle 101 are contemplated.

In accordance with aspects of the present disclosure, the server 510 can analyze historical orders to identify ordering patterns. For example, there may be recurring peak times when particular orders are placed, such as coffee orders between 7:00 AM and 8:00 AM, or peak times when particular orders are delivered to certain locations. In various embodiments, the server 510 can preemptively instruct one or more robots 101 to preemptively prepare orders before the orders are actually placed by consumers. In various embodiments, the server 510 can communicate actual orders to the robots 101, with the orders having no assigned customer. If a customer 202 places an order that has been preemptively assigned to a vehicle 101, the server 510 can associate the customer 202 with the preemptive order and communicate the customer information to the vehicle 101. The disclosed embodiments are exemplary, and other variations and embodiments of implementing order analytics and forecasts, and implementing preemptive orders, are contemplated to be within the scope of the present disclosure.

In accordance with aspects of the present disclosure, and with reference again to FIG. 9, the following will describe control and processing of an autonomous vehicle 101 that receives an order. As shown in FIG. 9, an autonomous vehicle 101 includes a robot processor 125. The robot processor 125 executes instructions stored in a memory 514 (FIG. 12) to perform the operations described herein, including determining a travel route for delivering orders. In various embodiments, a vehicle 101 that receives an order for a delivery destination can use the navigation module 140 to determine a travel route that includes the destination.

With continuing reference to FIG. 9, after the processor 125 has selected a travel route, the processor 125 controls the conveyance system 130 to travel the travel route. During the travel, the processor 125 controls the securable storage compartments 102, 104 based on the temperature and/or humidity control requirements for the grocery orders.

The Operating Environments

In some embodiments, the unstructured open environment is a non-confined geographic region accessible by navigable pathways, including, for example, public roads, private roads, bike paths, open fields, open public lands, open private lands, pedestrian walkways, oceans, lakes, rivers, streams, airways, etc.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the Earth's atmosphere including the troposphere, the stratosphere, the mesosphere, the thermosphere and the exosphere.

In some embodiments, the navigation module 140 controls routing of the conveyance system 130 of the robots in the fleet in the unstructured open or closed environments.

The Fleet of Robot Vehicles

In accordance with aspects of the present disclosure, and with reference again to FIG. 7, provided herein is the robot fleet 100 having robots 101, with each robot 101 operating fully-autonomously (e.g., unmanned) or semi-autonomously. In some embodiments, the robot fleet 100 is fully-autonomous. In some embodiments, the robot fleet 100 is semi-autonomous.

As illustrated in FIGS. 1 and 2, one exemplary configuration of a vehicle 101 is a vehicle configured for land travel, such as a small fully-autonomous (or semi-autonomous) automobile. The exemplary vehicle 101 is narrow (e.g., 2-5 feet wide), low mass and low center of gravity for stability, having multiple secure storage compartments 102, 104 assignable to one or more customers, retailers and/or vendors, and designed for moderate working speed ranges (e.g., up to 45.0 mph) to accommodate inner-city and residential driving speeds. Additionally, in some embodiments, the robots 101 in the fleet are configured with a maximum speed range up to about 90.0 mph for high speed, intrastate or interstate driving. Each vehicle 101 in the fleet is equipped with a sensor system 170 including any number of onboard sensors such as cameras (e.g., running at a high frame rate, akin to video), LiDAR, radar, ultrasonic sensors, microphones, etc. and internal computer processing to constantly determine where it can safely navigate, what other objects are around each vehicle 101 and what it may do.

In some embodiments, it may be necessary to have communication between one or more robots 101, a fleet operator/manager 200, a provider 204 and/or a customer 202 to address previously unforeseen issues (e.g., a malfunction with the navigation module 140; provider inventory issues; unanticipated traffic or road conditions; or direct customer interaction after the robot arrives at the customer location), as shown in FIG. 10.

In some embodiments, the robot fleet 100 is controlled directly by the fleet manager 200. In some embodiments, it may be necessary to have direct human interaction between the customer 202 and the fleet operator (not shown) (e.g., through vehicle 101) to address maintenance issues such as mechanical failure, electrical failure or a traffic accident.

In some embodiments, the robot fleet 100 is configured for land travel. In some embodiments, each vehicle 101 in the fleet 100 is configured with a working speed range from 13.0 mph to 45.0 mph. In some embodiments, the robots 101 in the fleet 100 are configured with a maximum speed range from 13.0 mph to about 90.0 mph.

In some embodiments, the robot fleet 100 is configured for water travel as a watercraft and is configured with a working speed range up to 45.0 mph.

In some embodiments, the robot fleet 100 is configured for hover travel as an over-land or over-water hovercraft and is configured with a working speed range up to 60.0 mph.

In some embodiments, the robot fleet 100 is configured for air travel as an aerial drone or aerial hovercraft and is configured with a working speed range up to 80.0 mph.

In some embodiments of the robot fleet 100, the autonomous robots 101 within the fleet 100 are operated on behalf of third party vendor/service provider. For example, a fleet management service is established to provide a roving delivery service for a third party grocery provider (e.g., an ice cream service/experience for a third party vendor (e.g., Haagen-Dazs®)). It is conceived that the fleet management service would provide a sub-fleet of "white label" vehicles carrying the logo and products of that third party grocery provider to operate either fully-autonomously or semi-autonomously to provide this service.

In some embodiments of the robot fleet 100, the autonomous robots 101 within the fleet 100 are further configured to be part of a sub-fleet of autonomous robots 101, and each sub-fleet is configured to operate independently or in tandem with multiple sub-fleets having two or more sub-fleets.

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of robots 101 in the fleet. In so doing, they can guarantee a certain level of responsiveness. When they aren't using the robots 101, the robots 101 are used for general services within the fleet 100 (e.g., other third parties).

In some embodiments, the robot fleet 100 is controlled directly by the manager 200.

In some embodiments, there will likely be times when a vehicle 101 breaks down, has an internal system or module failure or is in need of maintenance. For example, in the event that the navigation module 140 should fail, each vehicle 101 within the fleet 100 is configurable to allow for direct control of the robot's processor 125 to override the conveyance 130 and sensor systems (e.g., cameras, etc.) by a fleet operator (not shown) to allow for the safe return of the vehicle 101 to a base station for repair or maintenance.

The Fleet Management Module

With reference again to FIGS. 7-14, and more specifically with respect to FIG. 8, in some embodiments of the robot fleet 100, the fleet 100 includes a fleet management module 120 (associated with a central server 110) for coordination of the robot fleet 100 and assignment of tasks for each vehicle 101 in the fleet 100. The fleet management module 120 coordinates the activity and positioning of each vehicle 101 in the fleet 100. In addition to communicating with the robot fleet 100, fleet operator (not shown), the fleet management module 120 also communicates with providers/vendors/businesses 204 and customers 202 to optimize behavior of the entire system.

The fleet management module 120 works in coordination with a central server 110, typically located in a central operating facility owned or managed by the fleet operator (not shown).

In one embodiment, a request is sent to a main server 110 (typically located at the fleet manager's location), which then communicates with the fleet management module 120. The fleet management module 120 then relays the request to the appropriate provider 204 of the service (e.g., store, warehouse, vendor, retailer, etc.) and an appropriate robot or robots 101 in the fleet 100. The most appropriate robot(s) 101 in the fleet 100 within the geographic region, and which may be closest to the service provider 204, is then assigned the task. The service provider 204 then interacts with that vehicle 101 at their business (e.g., loading it with goods, if needed). The vehicle 101 then travels to the customer 202 and the customer 202 interacts with the vehicle 101 to retrieve their goods or service (e.g., items ordered). An interaction can include requesting the vehicle 101 to open its compartment(s) 102, 104 through the customer's app or through a user interface 145 (FIG. 13) on the vehicle 101 itself (using, e.g., RFID reader and customer phone, a touchpad, a keypad, voice commands, vision-based recognition of the person, etc.) (see FIGS. 1, 13 and 14). Upon completion of the delivery (or retrieval, if appropriate), the vehicle 101 reports completion of the assignment and reports back to the fleet management module 120 for re-assignment (e.g., to another order), repair, and/or maintenance (e.g., to a base station or repair shop).

As further illustrated in FIG. 8, and previously noted, in some embodiments, the fleet management module 120 handles coordination of the robot fleet 100 and assignment of tasks for each vehicle 101 in the fleet 100. The fleet management module 120 coordinates the activity and positioning of each vehicle 101 in the fleet 100. The fleet management module 120 also communicates with vendors/businesses 204 and customers 202 to optimize behavior of the entire system. It does this by utilizing the robot's processor 125 to process the various inputs and outputs from each of the robot's systems and modules, including: the conveyance system 130, the power system 135, the navigation module 140, the sensor system 170, the communication module 160, and/or the controller 150 to effectively manage and coordinate the various functions of each vehicle 101 in the fleet 100.

In some embodiments, the vehicle 101 may be requested for a pick-up of an item (e.g., a good or document such as a receipt) with the intent of delivery to another party. In this scenario, the fleet management module 120 would assign the vehicle 101 to arrive at a given location, assign a securable storage compartment for receiving the item, confirm receipt from the first party to the fleet management module 120, then proceed to the second location where an informed receiving party would recover the item from the vehicle 101 using an appropriate PIN or other recognition code to gain access to the secure storage compartment. The vehicle 101 would then report completion of the assignment and report back to the fleet management module 120 for re-assignment.

In accordance with aspects of the present disclosure, the central server 110 and/or the fleet management module 120 can include or can be part of a delivery system (e.g., for managing the fleet 100).

Goods and Services

In some embodiments, the operator (not shown) includes a fleet manager, a sub-contracting vendor, a service provider, a customer, a business entity, an individual, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar goods within the same interaction (e.g., signed documents), the user receiving one set of goods and returning a different set of goods within the same interaction (e.g., replacement/returns, payment transactions, etc.), a third party user providing instruction and or authorization to a goods or service provider to prepare, transport, deliver and/or retrieve groceries to a principle user in a different location.

In some embodiments, the services further include: advertising services, land survey services, patrol services, monitoring services, traffic survey services, signage and signal survey services, architectural building or road infrastructure survey services.

In some embodiments, at least one vehicle 101 is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots 101 within the fleet 100 are equipped for financial transactions. These can be accomplished using known transaction methods such as debit/credit card readers or the like.

In accordance with aspects of the present disclosure, when the robot fleet 100 is configured as a roving fleet, such robots 101 can reduce the wait time from customer order to delivery.

Securable Compartments

Figure 14:
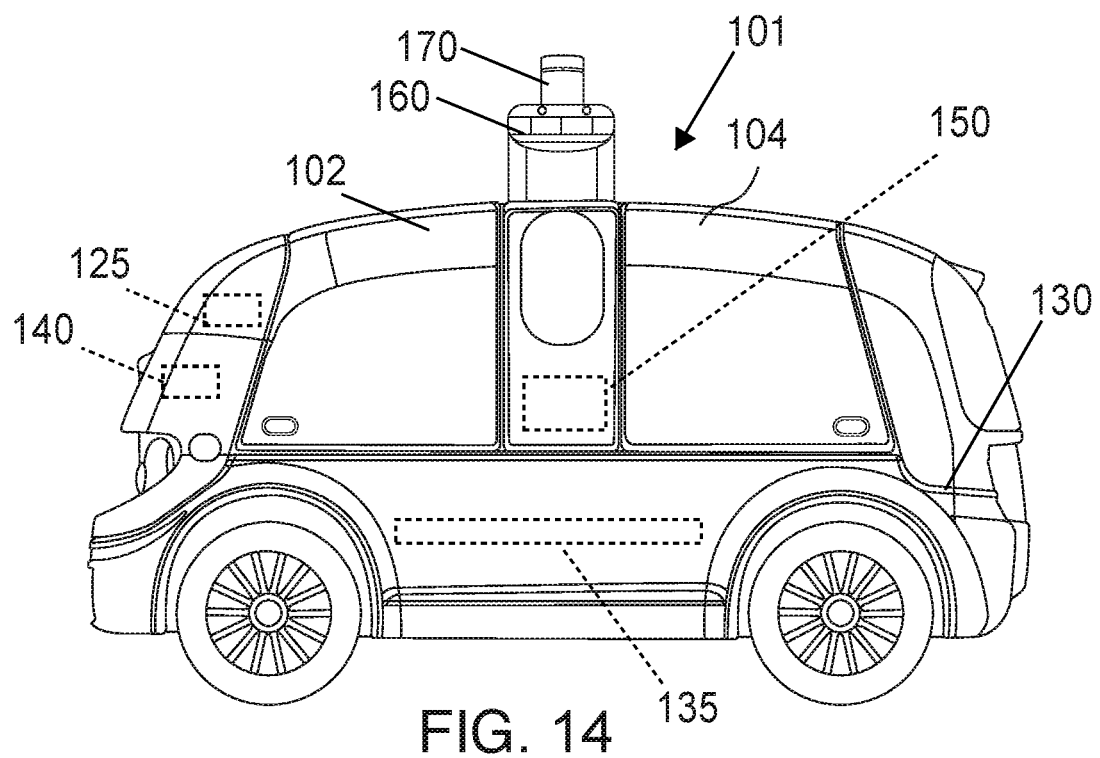
FIG. 14 is a left, side view of the robot vehicle of FIG. 1 shown adjacent to the individual customer of average height seen in FIG. 1.

As illustrated in FIGS. 13 and 14, robots 101 in the fleet 100 are each configured for transporting, delivering or retrieving goods or services and are capable of operating in an unstructured open environment or closed environment. In some embodiments, the vehicle 101 is configured to travel practically anywhere (e.g., land, water, air, etc.). The vehicle 101 includes two large storage compartments 102, 104 on each side of the vehicle 101, but may include any number of compartments. For ease of explanation, a compartment or sub-compartment can be referred to as a module. Large storage compartments 102, 104 can include any number of smaller internal secure storage compartments of various configurations such as compartments 102a, 102b, 104a, 104b, respectively, for carrying individual items that are to be delivered to, or need to be retrieved from customers 202. The internal secure compartments 102a, 102b, 104a, 104b, may also be referred to herein as sub-compartments. Additionally, within the context of descriptions relating to compartments and sub-compartments, the term "module" may be used herein to refer to a compartment and/or a sub-compartment.

In certain embodiments, one or more of the compartment(s) may include compartment lighting 106 (e.g., for night deliveries).

In some embodiments, the securable compartments are variably configurable based on: anticipated demands, patterns of behaviors, area of service, or types of goods to be transported.

Referring again to FIG. 9 each vehicle 101 includes securable storage compartments 102, 104 to hold goods, and a controller 150 configurable to associate each one of the securable compartments 102, 104 to an assignable customer 202 or provider 204 and provide entry when authorized. Each vehicle 101 further includes at least one processor 125 configured to manage the conveyance system 130, the navigation module 140, the sensor system 170, instructions from the fleet management module 120, the communication module 160, and the controller 150.

As described previously, each vehicle 101 is configured with securable storage compartments 102, 104. Alternately, a vehicle 101 is configurable to contain a set of goods or even a mobile marketplace (similar to a mini bar at a hotel).

When a robot is assigned to a customer 202, one or more of the compartments 102, 104 is also assigned to that customer 202. Each of the large compartments 102, 104 is secured separately and can securely transport groceries to a separate set of customers 202.

Upon arrival of the vehicle 101 to the customer destination, the customer 202 can then open their respective compartment(s) by verifying their identity with the vehicle 101. This can be done through a wide variety of approaches comprising, but not limited to:

1. The customers can be given a PIN (e.g., 4 digit number) when they make their initial request/order. They can then enter this pin at the robot using the robot touchscreen or a keypad.
2. The customers can verify themselves using their mobile phone and an RFID reader on the robot.
3. The customers can verify themselves using their voice and a personal keyword or key phrase they speak to the robot.
4. The customers can verify themselves through their face, a government ID, or a business ID badge using cameras and facial recognition or magnetic readers on the robot.
5. The customers can verify themselves using their mobile phone; by pushing a button or predetermined code on their phone (and the system could optionally detect the customer is near the robot by using their GPS position from phone)

Additional Features

In some embodiments, the robot fleet 100 further includes at least one vehicle 101 having a digital display for curated content comprising: advertisements (e.g., for both specific user and general public), including services provided, marketing/promotion, regional/location of areas served, customer details, local environment, lost, sought or detected people, public service announcements, date, time, or weather.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," "in certain embodiments," "in other embodiments," or the like may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and shown in the accompanying figures are non-limiting exemplary embodiments, and that the description, disclosure, and figures should be construed merely as exemplary of particular embodiments. It is to be understood, therefore, that the present disclosure is not limited to the precise embodiments described, and that various other changes and modifications may be effected by one skilled in the art without departing from the scope or spirit of the disclosure. Additionally, the elements and features shown or described in connection with certain embodiments may be combined with the elements and features of certain other embodiments without departing from the scope of the present disclosure, and that such modifications and variations are also included within the scope of the present disclosure. Accordingly, the subject matter of the present disclosure is not limited by what has been particularly shown and described.

What is claimed is:

1. An autonomous robotic vehicle, comprising:
   a chassis;
   a plurality of wheels movably mounted to the chassis by a suspension system; and
   a vehicle pose system, the vehicle pose system including:
   a ride height sensor system configured to measure wheel displacement of the plurality of wheels relative to the chassis as the plurality of wheels move relative to the chassis, the ride height sensor system including ride height sensors configured to determine wheel positions of each of the plurality of wheels with respect to the chassis as the autonomous robotic vehicle travels along a surface in a forward direction;
   at least one processor; and
   a memory having instructions stored thereon which, when executed by the at least one processor cause the vehicle pose system to:
   determine a plane of the surface corresponding to the wheel positions as the autonomous robotic vehicle travels along the surface in the forward direction;
   determine a rotation matrix indicating an orientation of the autonomous robotic vehicle as the autonomous robotic vehicle travels along the surface in the forward direction;

determine a three-dimensional (3D) travel vector of the autonomous robotic vehicle based on the plane of the surface and the rotation matrix, wherein an absolute value of the 3D travel vector is proportional to a wheel speed of the plurality of wheels and is relative to the rotation matrix, and wherein a forward direction vector of the rotation matrix and the 3D travel vector are not parallel; and determine a pose of the autonomous robotic vehicle based on a 3D velocity and a 3D position of the autonomous robotic vehicle associated with the 3D travel vector, and the rotation matrix, which are obtained by associating global positioning data of the autonomous robotic vehicle, wheel speed data of the autonomous robotic vehicle including an average wheel speed of the plurality of wheels as measured by a speed of a motor of the autonomous robotic vehicle, and ride height data obtained from at least three of the plurality of wheels of the autonomous robotic vehicle based on measurements by the ride height sensor system, wherein the pose of the autonomous robotic vehicle is an environmental positioning of the autonomous robotic vehicle or of at least one object stored inside the autonomous robotic vehicle.

2. The autonomous robotic vehicle of claim 1, wherein the vehicle pose system includes an inertial measurement unit configured to collect orientation data of the autonomous robotic vehicle, angular velocity data of the autonomous robotic vehicle, gravitational direction data of the autonomous robotic vehicle, or combinations thereof.

3. The autonomous robotic vehicle of claim 1, wherein the vehicle pose system includes a global positioning system configured to collect the global positioning data of the autonomous robotic vehicle.

4. The autonomous robotic vehicle of claim 1, wherein the vehicle pose system includes wheel speed sensors configured to collect the wheel speed data of the plurality of wheels.

5. The autonomous robotic vehicle of claim 2, wherein the inertial measurement unit includes an accelerometer, a gyroscope, or combinations thereof.

6. The autonomous robotic vehicle of claim 4, wherein the wheel speed sensors are coupled to the plurality of wheels.

7. The autonomous robotic vehicle of claim 1, wherein the ride height sensors are coupled to the chassis, at least some of the plurality of wheels, the suspension system, or combinations thereof.

8. The autonomous robotic vehicle of claim 1, wherein when executed by the at least one processor, the instructions stored on the memory cause the at least one processor to map a position and orientation of the autonomous robotic vehicle within a coordinate system based on the determined pose.

9. The autonomous robotic vehicle of claim 1, wherein the autonomous robotic vehicle is a driverless vehicle.

10. A vehicle pose system for an autonomous robotic vehicle, the vehicle pose system including:

a ride height sensor system configured to measure wheel displacement of a plurality of wheels of the autonomous robotic vehicle relative to a chassis of the autonomous robotic vehicle as the plurality of wheels move relative to the chassis, the ride height sensor system including ride height sensors configured to determine wheel positions of each of the plurality of wheels with respect to the chassis as the autonomous robotic vehicle travels along a surface in a forward direction;

at least one processor; and a memory having instructions stored thereon which, when executed by the at least one processor cause the vehicle pose system to:

determine a plane of the surface corresponding to the wheel positions as the autonomous robotic vehicle travels along the surface in the forward direction;

determine a rotation matrix indicating an orientation of the autonomous robotic vehicle as the autonomous robotic vehicle travels along the surface in the forward direction;

determine a three-dimensional (3D) travel vector of the autonomous robotic vehicle based on the plane of the surface and the rotation matrix, wherein an absolute value of the 3D travel vector is proportional to a wheel speed of the plurality of wheels and is relative to the rotation matrix, and wherein a forward direction vector of the rotation matrix and the 3D travel vector are not parallel; and determine a pose of the autonomous robotic vehicle based on a 3D velocity and a 3D position of the autonomous robotic vehicle associated with the 3D travel vector, and the rotation matrix, which are obtained by associating global positioning data of the autonomous robotic vehicle, wheel speed data of the autonomous robotic vehicle including an average wheel speed of the plurality of wheels as measured by a speed of a motor of the autonomous robotic vehicle, and ride height data obtained from at least three of the plurality of wheels of the autonomous robotic vehicle based on measurements by the ride height sensor system, wherein the pose of the autonomous robotic vehicle is an environmental positioning of the autonomous robotic vehicle or of at least one object stored inside the autonomous robotic vehicle.

11. The vehicle pose system of claim 10, wherein the vehicle pose system includes an inertial measurement unit configured to collect orientation data of the autonomous robotic vehicle.

12. The vehicle pose system of claim 10, wherein the vehicle pose system includes a global positioning system configured to collect the global positioning data of the autonomous robotic vehicle.

13. The vehicle pose system of claim 10, wherein the vehicle pose system includes wheel speed sensors configured to collect the wheel speed data of the plurality of wheels.

14. The vehicle pose system of claim 11, wherein the inertial measurement unit includes an accelerometer, a gyroscope, or combinations thereof.

15. The vehicle pose system of claim 13, wherein the wheel speed sensors are configured to couple to the plurality of wheels.

16. A method comprising:

determining wheel positions of each of plurality of wheels with respect to a chassis of an autonomous robotic vehicle as the autonomous robotic vehicle travels along a surface in a forward direction;

determining a plane of the surface corresponding to the wheel positions as the autonomous robotic vehicle travels along the surface in the forward direction;

determining a rotation matrix indicating an orientation of the autonomous robotic vehicle as the autonomous robotic vehicle travels along the surface in the forward direction;

determining a three-dimensional (3D) travel vector of the autonomous robotic vehicle based on the plane of the surface and the rotation matrix, wherein an absolute value of the 3D travel vector is proportional to a wheel speed of the plurality of wheels and is relative to the rotation matrix, and wherein a forward direction vector of the rotation matrix and the 3D travel vector are not parallel; and determine a pose of the autonomous robotic vehicle based on a 3D velocity and a 3D position of the autonomous robotic vehicle associated with the 3D travel vector, and the rotation matrix, which are obtained by associating global positioning data of the autonomous robotic vehicle, wheel speed data of the autonomous robotic vehicle including an average wheel speed of the plurality of wheels as measured by a speed of a motor of the autonomous robotic vehicle, and ride height data obtained from at least three of the plurality of wheels of the autonomous robotic vehicle based on measurements of the wheel positions, wherein the pose of the autonomous robotic vehicle is an environmental positioning of the autonomous robotic vehicle or of at least one object stored inside the autonomous robotic vehicle.

17. The method of claim 16, further comprising:
communicating the pose of the autonomous robotic vehicle to a fleet management module having at least one hardware component and that coordinates one or more activities of the autonomous robotic vehicle.

18. The method of claim 16, further comprising:
collecting orientation data of the autonomous robotic vehicle, angular velocity data of the autonomous robotic vehicle, gravitational direction data of the autonomous robotic vehicle, or combinations thereof, wherein the plane of the surface is defined as substantially simultaneously contacting a bottom surface of each of the plurality of wheels and is computed based on a wheel displacement of the plurality of wheels measured by a ride height sensor system.

19. The method of claim 16, further comprising:
mapping a position and orientation of the autonomous robotic vehicle within a coordinate system based on the determined pose.

20. The method of claim 16, wherein the pose of the autonomous robotic vehicle is a first approximation of $v=T$ and $p=\int T \cdot dt$, and where v is the 3D velocity of the autonomous robotic vehicle in earth coordinates, T is the 3D travel vector, and p is the 3D position of the autonomous robotic vehicle in the earth coordinates.

* * * * *